United States Patent [19]

St. John et al.

[11] Patent Number: 4,569,584

[45] Date of Patent: Feb. 11, 1986

[54] COLOR ELECTROGRAPHIC RECORDING APPARATUS

[75] Inventors: Robert P. St. John, Sunnyvale; William A. Lloyd, Los Altos, both of Calif.

[73] Assignee: Xerox Corporation, Stamford, Conn.

[21] Appl. No.: 679,598

[22] Filed: Dec. 7, 1984

Related U.S. Application Data

[63] Continuation of Ser. No. 444,144, Nov. 24, 1982, abandoned.

[51] Int. Cl.$^4$ ............................................. G03G 15/01
[52] U.S. Cl. .................................... 355/14 R; 355/4; 355/77; 346/157; 358/75; 101/151; 101/DIG. 13
[58] Field of Search ...................... 355/4, 88, 77, 14 R; 430/44; 346/157; 358/75, 78; 118/645; 101/151, 152, 248, DIG. 13

[56] References Cited

U.S. PATENT DOCUMENTS

| | | | |
|---|---|---|---|
| 2,566,399 | 9/1951 | Bishop | 101/248 |
| 2,840,721 | 6/1958 | Frommer | 242/57.1 X |
| 2,888,260 | 5/1959 | Schowerer et al. | 226/10 |
| 3,278,939 | 10/1966 | Morton | 226/10 X |
| 3,366,876 | 1/1968 | Kurth et al. | 242/57.1 X |
| 3,525,872 | 8/1970 | Schneider | 250/548 |
| 3,653,065 | 3/1972 | Brown | 101/DIG. 13 |
| 3,781,490 | 12/1973 | Phillips | 242/75.51 X |
| 3,919,560 | 11/1975 | Nopper | 250/557 |
| 4,007,489 | 2/1977 | Helmberger et al. | 358/78 |
| 4,042,939 | 8/1977 | Lloyd et al. | 346/153 |
| 4,121,888 | 10/1978 | Tomura et al. | 355/3 FU |
| 4,147,104 | 4/1979 | Zernov et al. | 101/181 |
| 4,286,031 | 8/1981 | Kuehnle et al. | 430/44 |
| 4,289,092 | 9/1981 | McChesney et al. | 118/660 |
| 4,315,270 | 2/1982 | Lloyd et al. | 346/155 |
| 4,363,271 | 12/1982 | Horst | 101/181 |
| 4,364,502 | 12/1982 | Frentress | 226/15 X |
| 4,401,024 | 8/1983 | Frentress | 101/DIG. 13 |

FOREIGN PATENT DOCUMENTS

| | | |
|---|---|---|
| 2658659 | 6/1978 | Fed. Rep. of Germany . |
| 57-122455 | 7/1982 | Japan . |
| 57-114158 | 7/1982 | Japan . |
| 57-124753 | 8/1982 | Japan . |
| 1463197 | 2/1977 | United Kingdom . |
| 2022018 | 12/1979 | United Kingdom . |

OTHER PUBLICATIONS

J. S. Heath—"Color Printing Apparatus"—IBM T.D.B. vol. 21(11), pp. 4665–4667, Apr. 1979.

Primary Examiner—R. L. Moses
Attorney, Agent, or Firm—W. Douglas Carothers, Jr.

[57] ABSTRACT

A color electrographic recording apparatus is provided to produce on a recording medium a composite color image comprising a plurality of superimposed component images of different colors, e.g., magenta, cyan, yellow and black. The apparatus includes means for transporting the recording medium in opposite directions along a predetermined path through the electrographic recording apparatus, a recording station in the path and having a recording head with electrode means for forming a latent image on the recording medium, control means operative to energize the electrode means to create a latent image on the recording medium, a plurality of developing means adjacent either one side or both sides of the recording station in the path, each of the developing means for developing a latent image produced on the recording medium at the recording station into a corresponding visible component image of a respective color. The transport means is operative to pass a section of the recording medium through the recording station to form a first component latent image followed by its respective color development and reverse the direction of medium transport to permit formation of a next component latent image followed by its respective color development and repeating this process until all component latent images and their respective color development have been completed to form a composite color image. The color electrographic recording apparatus also includes unique registration means associated with the transport of the recording medium and the apparatus control means to form each component latent image so that all the component color images will be superimposed on one another even in spite of any shrinkage or expansion of the medium during its multiple handling and processing by the electrographic recording apparatus.

35 Claims, 23 Drawing Figures

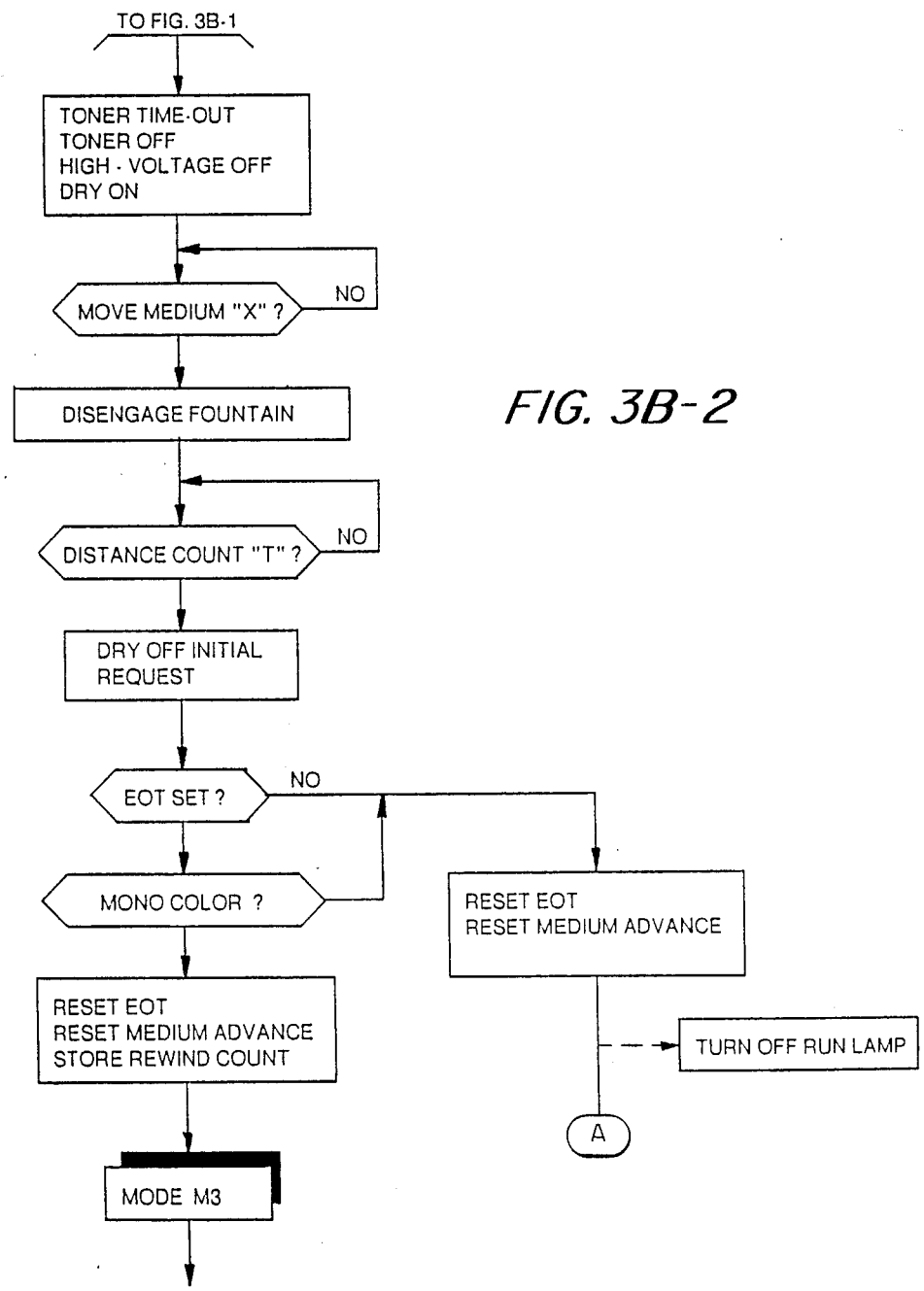

COLOR ELECTROGRAPHIC RECORDING APPARATUS

RELATED APPLICATION

This is a continuation of application Ser. No. 444,144, filed Nov. 24, 1982 now abandoned. U.S. application Ser. No. 444,142, filed Nov. 24, 1982 and entitled Web Tracking System and assigned to the assignee herein.

BACKGROUND OF THE INVENTION

The present invention relates to the art of electrographic recording systems and more particularly to an apparatus and method for forming electrostatic latent images on a recording medium with information provided by electronic signals.

This invention is particularly applicable to the color electrographic art and apparatus suitable for consecutively forming latent component images which are subsequently developed with a respective color developer and which are superimposed to produce a composite color image on the recording medium.

The electrographic recording process for producing a visible image can be generally characterized as two step process. The first step in an electrostatic recording image is formed on a record medium at a recording station having a recording head. One version of the recording head comprises a plurality of recording or writing electrodes or multistylus physically positioned to electrically address a dielectric surface of the recording medium as the medium travels through the recording station. Oppositely opposed to these writing electrodes is an aligned series of backup electrodes. These oppositely opposed writing and backup electrodes form a printing gap. An electrostatic charge is deposited on the dielectric portion of the recording medium as the medium is moved through the gap when the potential difference between addressed writing electrodes and the oppositely opposed backup electrodes is raised to a threshold level, also referred to as the Paschen breakdown point, comprising several hundreds of volts. The timing sequencing of energization of the electrodes provides for electrical charging of selected areas of the medium to form a desired latent image as the medium is moved through the recording station.

The second step is rendering the electrostatic latent image visible by toning or developing the latent electrostatic image deposited on the medium. Development may comprise liquid or dry toner. In the latter case, some type of fusing of the toner to the medium may be employed, e.g., flash fusing. In the former case, provision may be made to aid in the removal of excess toner followed by the drying of the liquid toned medium surface. As a result, a permanent fixed printed record is formed on the recording medium.

Commercially successful electrographic apparatus in the past has involved one recording station and one development station with one toning medium, which is usually black. In recent years there has been increasing pressure on electrographic system vendors to create and develop reliable color electrographic systems. This is particularly true because of the increased employment of color CAD system usage and color LSI/VLSI design mandating the use of color display and design and, consequently, requiring color hard copy output.

While many color hardcopy systems have been proposed and designed, most have not been as successful in meeting the requirements for good color output except possibly for the color pen plotter systems. Such systems are provided with multiple color pens that trace according to electrical signal input to produce a multicolor output on a recording medium. However, such systems also have drawbacks in that full, filled in and uniform color areas or zones on the medium are not readily possible as is in the case of electrographic systems using a color or black developing medium. This would be desirable in applications such as VLSI chip layouts.

Going from single color to multiple color electrographic recording, a complex problem is encountered. In single color recording, the latent image is formed followed by its immediate development. However, in color recording, two or more latent images must be independently formed and developed and superimposed upon one another. Thus, some means of registration is mandatory to insure that the different color component images are sufficiently superimposed to prevent color fringes and color errors and provide a high resolution color print.

Series color electrographic systems are not new. An example in the xerographic arts is disclosed in U.S. Pat. No. 4,286,031. In this patent, a plurality of latent electrostatic images of different colors in registration are achieved to produce a composite color image. It is not specifically mentioned as to how superposition of the component images is accomplished.

The problem of color image component registration and a proposed solution was recognized in U.S. Pat. No. 4,007,489. In this patent, a series of recording/developing stations are provided, i.e., each station is provided with a recording head and respective color developer. Component image registration is accomplished by the use of a printed cross mark placed on the medium surface which is sensed by a series of sensors before each recording/developing station. However, the use of a single registration mark and multiple recording stations has several drawbacks. displacement both in the lateral and longitudinal directions of the record medium can easily occur because of the differences (1) as to time placement of the latent images being formed, and (2) as to the physical parameters of the different recording head structures. Also, there are variations in the position of the recording medium as it moves through the system from station to station. Also, the recording medium will change in size, i.e., it will stretch or expand, or shrink or contract both laterally and longitudinally relative to its length. Such expansion or shrinkage is sufficient to produce low composite image resolution due to color fringes and color registration errors and result in component image misalignment.

It is not precisely known as to all the factors that might contribute to dimensional changes in the recording medium but it is believed that the major factors involved are medium handling, image development and image fixing. In the usual case of recording medium comprising dielectric coated paper, the medium can stretch or shrink as much as 1 mil per foot and the dimensional change laterally across this type of medium can be three times greater than the dimensional change along the longitudinal extent of the medium. The medium is acceptable to such dimensional changes due to the manner by which it is made. For example, the fiberous grain of the paper base of such recording media is such that it can stretch or shrink more in one orthogonal direction as compared to another. Other recording media, e.g., polyester based transparent recording media, may not stretch or shrink as much as paper based media, but are still succeptable to stretching and shrinkage.

Further, paper based recording medium is neither precisely flat or straight nor are the medium edges exactly parallel to one another.

These medium dimensional changes and physical irregularities which occur while the medium is moving through the color electrographic system will contribute significantly to providing color component image registration that is not sufficiently acceptable for commercial usage without adequate color component image registration.

While one solution to this problem might be to require tighter specifications in the design and manufacture of recording media without these irregularities, this would not be desirable because of the high costs to provide such quality control in the manufacture of this media, which would not be acceptable to media manufacturers. The better approach is to create a color electrographic machine that is capable of "living" with these irregularities and capable of controlling the registration of sequential composite latent images by measurement and control of machine functions without requiring changes to the recording medium.

As previously indicated, the proposed solution of U.S. Pat. No. 4,007,489 is to provide a mark on the recording medium. The mark in the form of a cross is provided as a latent image at the first recording station outside the image field where it is also developed as a visible image. The mark is then photoelectrically sensed at subsequent recording stations. The sensor comprises a set of laterally disposed photodiodes. Sensing in the lateral or y direction of the recording medium, i.e., parallel to the aligned electrodes, is accomplished by determining a deviation in the position of the horizontal line bar of the cross mark and thereafter controlling which electrode in the aligned electrodes at the respective station will serve as a start point for a line of recorded information. Sensing in the longitudinal or x direction of the recording medium is accomplished by determining the beginning of the vertical line bar of the cross mark.

The drawback of this registration system is principally two fold. First, a different set of recording electrodes is present at each station having their individual character as to variations in electrode spacing and alignment and electrode head warpage. Secondly, no provision is made for continuously monitoring changes in medium expansion or shrinkage and take corrective action based upon those changes. The single cross mark is placed on the medium from which lateral and longitudinal approximation is accomplished for superimposition of the component latent images. Nothing is taken into account for handling on-the-fly correction relative to the disposition of latent component images based upon measurements made electronically that are indicative of recording medium irregularities.

SUMMARY OF THE INVENTION

According to this invention, a color electrographic recording apparatus and method is provided for producing on a recording medium a composite color image, a plurality of superimposed component images of different colors devoid of the above mentioned drawbacks.

The color electrographic recording apparatus of this invention includes a single recording station having a recording electrode means for forming a latent image on the recording medium and a plurality of developing means adjacent either one side or both sides of recording station wherein each developing means is provided with a respective color developer to form a color image component of the composite image. The apparatus includes means to transport the recording medium in opposite directions through the apparatus so that a first latent component image is formed at the recording head followed by its color component development. Then recording medium reversal is accomplished at least once so that a second latent component image is formed superimposed over the first developed component image followed by its color component development. Then recording medium reversal is accomplished at least once so that a third latent component image is formed superimposed over the first and second developed component images. The process may then repeat again for as many color component images desired. At a minimum, it is preferred that four color component images be involved, i.e., magenta, cyan, yellow and black.

Since only one recording head is employed for forming all color component images, the idiosyncracies involving the physical parameters and characteristics for the particular recording head will be all the same for each formed color component image.

The preferred arrangement for forming the series of latent component images is to have the reversal developing means on one side of the recording station so that in order to form several color component images to produce a color composite, the direction of the recording medium must be reversed after the formation of a color component image and then reversed again to form the next latent component image. Alternatively, the next latent component image could be formed on the first direction reversal of the recording with the color component developing means for that image positioned on the other side of recording station. In either embodiment, a single recording station is utilized.

A further important aspect according to this invention is the provision of registration means associated with the transport of the recording medium and the formation of each component latent image so that the component color images will be superimposed on one another with sufficient accuracy to effectively eliminate color fringes, color errors and color misalignments objectionable to the human asthetics and disruptive of high composite image resolution.

The registration means comprising this invention includes recording means at the recording station to form aligned latent tracking indicia on the recording medium outside the field of the composite color image followed by the visible development of the tracking indicia. Alternatively, the tracking indicia can be printed on the recording medium at the time of its manufacture but this represents a substantial cost increase in this consumable that may not be cost effective.

Means associated with the transport of the recording medium photoelectrically senses the aligned tracking indicia and provides electrical signals representative of information as to the dimensional extent both laterally and longitudinally of the recording medium section being handled by the apparatus and useful to provide adjustment for both lateral and longitudinal registration of component latent images.

One aspect of the associated means is to provide relative translation between the recording medium and the recording head on-the-fly as the component latent image is being formed. This may be possibly accomplished in several ways. First, the supply roll from which the recording medium is paid out into the electrographic apparatus may be laterally translated relative to the medium path through the apparatus. Secondly, the recording head including the electrode means may be laterally translated relative to the recording medium. Third, the recording head may be rotated relative to the path of the recording medium through the apparatus.

Another aspect of the associated means is to control the rate of movement of the recording medium along its path based upon the sensed information or control the frequency of energizing the electrode means so that more lines or less lines of data may be provided in the formation of component latent images based upon the sensed information.

The tracking indicia may comprise an aligned series of registration marks having the same dimensional spacing and width adjacent one edge or adjacent both edges of the recording medium. The registration marks may be preceeded by a plurality of aligned initializing marks for a particular recording medium section which have a different geometric shape compared to the registration marks, e.g., a different mark width. The point of change from the last narrower initializing mark to the first wider registration mark is indicative of the starting location, termed START PLOT, for each component latent image.

Lateral and longitudinal dimensional changes in the medium derived from observation of an aligned row of registration marks is indicative of changes in length, either expansion or shrinkage, of the recording medium section under observation. In this regard, it should be noted that coarse correction for lateral alignment of the recording medium relative to the recording head due to medium shifting in the medium path can be accomplished by the lateral translation of the medium supply roll while fine correction for lateral concurrent latent image alignment due to medium expansion or shrinkage can be accomplished by the lateral translation of the recording head to recenter the head relative to the medium, or by the lateral shifting of the energization of the electrode means and the lateral start point of the latent image formation as contemplated in U.S. Pat. No. 4,007,489.

Alternatively, a tracking line adjacent to and parallel with the aligned row of registration marks at both edges of the recording medium may be employed for lateral head corrective translation.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 3B1 is a flow diagram of the PLOT or MODE M2 for the apparatus comprising this invention.

FIG. 3B2 is a second part of a flow diagram of the PLOT or MODE M2 for the apparatus comprising this invention.

DETAIL DESCRIPTION OF PREFERRED EMBODIMENT

Figure 1:
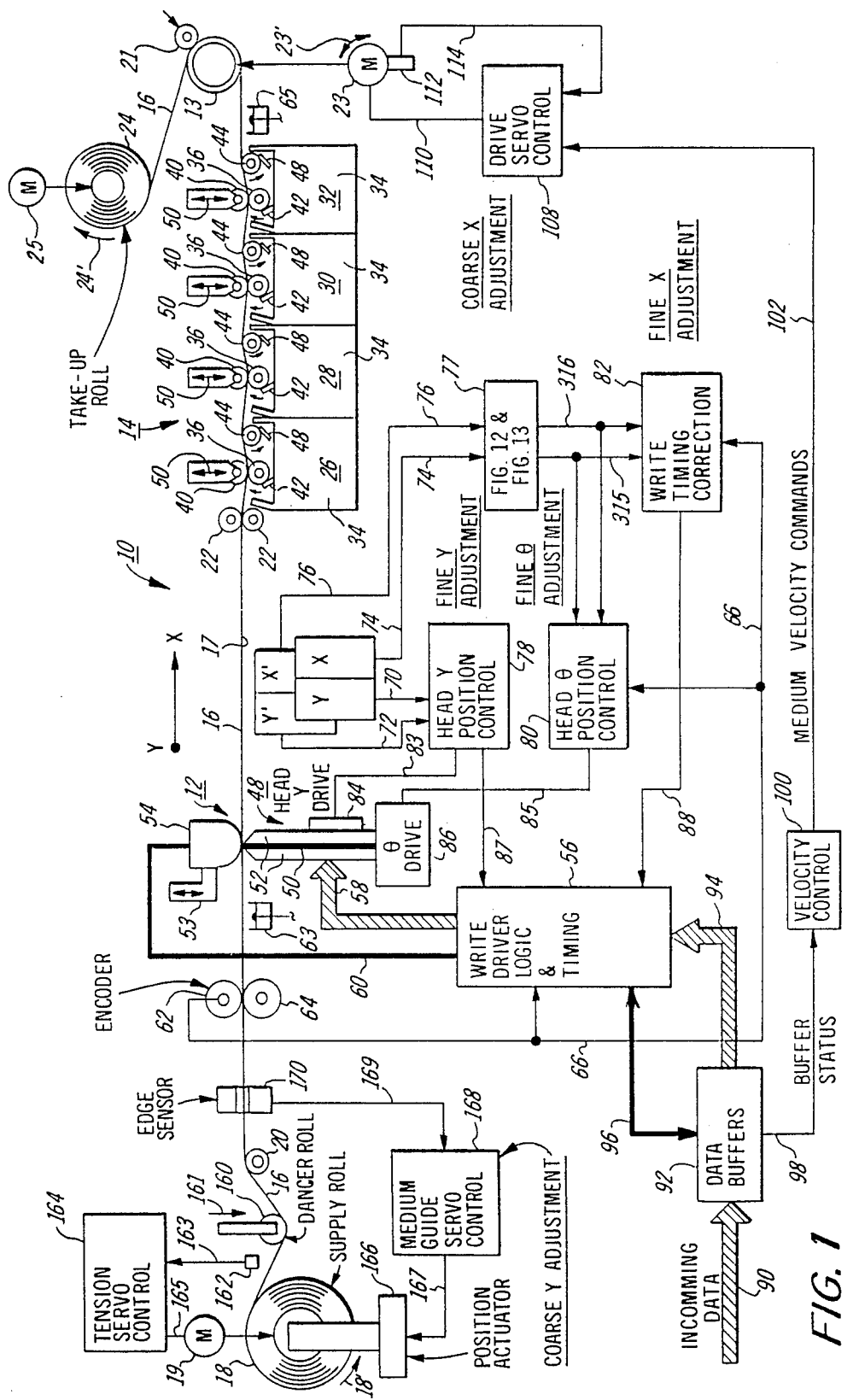
FIG. 1 is a schematic diagram showing a color electrographic apparatus according to one embodiment of this invention.

Referring to FIG. 1 there is diagrammatically shown one embodiment of the color electrographic apparatus 10 of this invention. Apparatus 10 comprises a recording station 12 and developing means 14 adjacent to station 12. Both station 12 and developing means 14 are aligned in the path of the recording medium 16. Recording medium 16 is drawn from supply roll 18 in the X direction over a series of rolls in the bed of apparatus 10, by means of drive roll 13 driven by drive motor 23. Only some of these rolls are shown at 20 and 22 for the purposes of simplicity. A series of rollers 21 are provided to ride against drive roll 13 in order to provide a firm grip on the medium 16. The medium 16 is taken up on take-up roll 24 driven by take-up motor 25.

Supply roll 18 is also provided with a drive motor 19 to rewind the paid out recording medium 16 back onto supply roll 18 for further processing by apparatus 10. The drive motor circuitry for rolls 18 and 24 is not shown, as such medium handling is conventional in the continuous web handling art involving the manufacturing, coating, utulizing (e.g., reel to reel recording tape transport) and other processing of continuous web material. Basically, supply roll motor 19 is continuously appying a driving force in the direction of arrow 18' while take up motor 25 is continuously applying drive in the direction of arrow 24'. These oppositely opposed drives maintain medium 16 in a state of equilibrium until drive motor 23 is enabled in either direction, as indicated by arrow 23', either to drive the medium 16 forward at a relatively slow rate for processing by apparatus 10 or to drive the medium 16 reward at a relatively fast rate to wind the medium 16 back onto supply roll 18.

Developing means 14 comprises a series of applicator roll type liquid development fountains 26, 28, 30 and 32 each of identical design. The fountains 26-32 are the subject matter of patent application Ser. No. 517,158 filed July 25, 1983, now U.S. Pat. No. 4,454,833 and are described only in general detail here. Other types of developing fountains may be employed in apparatus 10. For example, a dry toner system may be employed similar to that disclosed in U.S. Pat. No. 4,121,888. Also, the vacuum type liquid development fountain disclosed in U.S. Pat. No. 4,289,092 is suitable for use in apparatus 10, except that it is preferred that the individual vacuum fountains be selectively brought brought into engagement with and withdrawn away from the surface 17 of medium to be developed. Another liquid development system that may be employed is disclosed in the 8000-F Series Electrographic Film Plotter Operating Manual, Volume 1, published in 1981 and available from Versatec, Inc. of Santa Clara, Calif.

Figure 2:
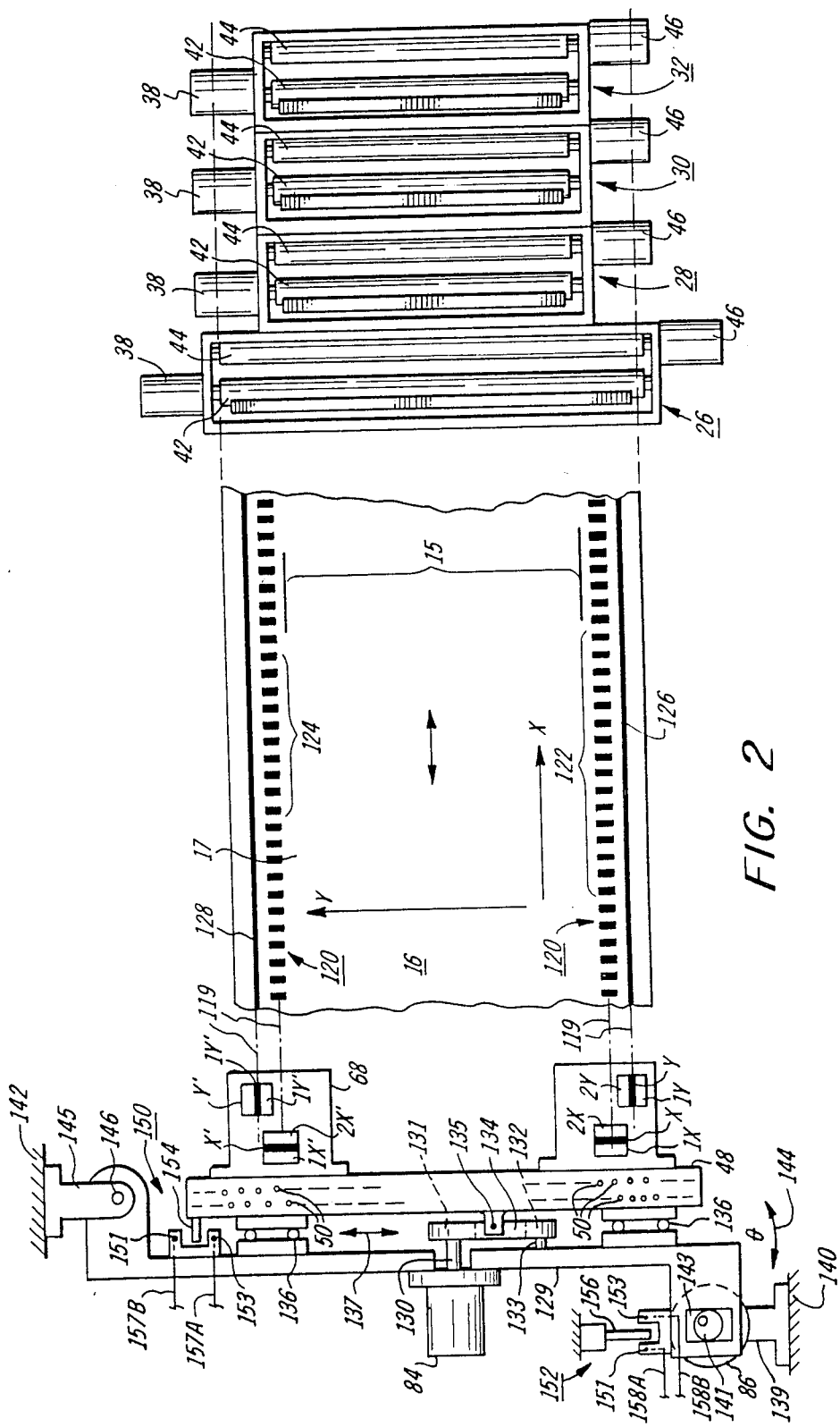
FIG. 2 is a schematic diagram showing a plan view of a portion of the recording medium path and the alignment arrangement of the medium relative to the recording station and the developing means for the apparatus shown in FIG. 1.

Referring to both FIGS. 1 and 2, each of the fountains 26-32 comprises a liquid toner container 34 within which is partly submerged the toner applicator roll 36. A portion of the side of the container 34 for each fountain is shown broken away in FIG. 1 in order to illustrate the relative relationship of the components comprising the fountain structures. Toner container 34 is provided with an inlet and outlet for replenishing the supply of liquid toner in a manner illustrated in U.S. Pat. No. 4,289,092. Roll 36 is rotated at high rotational velocity, e.g., 750 rpm with clockwise rotation when viewing FIG. 1, by means of motor 38 (FIG. 2). The high rotational velocity provides a sheath of liquid toner in a development gap between roll 36 and its backup roll 40. Resilient doctor blade 42 wipes roll 36 clean of excess toner and also aids in preventing toner buildup on its surface.

Just beyond the applicator roll 36 in each fountain is a drying roll 44. Drying roll 44 is rotated by means of motor 46 (FIG. 2) at a higher rotational velocity than applicator roll 36, e.g., 1200 rpm with counterclockwise rotation when viewing FIG. 1. Roll 4 removes excess toner from medium surface 16 as well as providing a drying action to its surface. Resilient doctor blade 48 is applied against roll 4 to wipe the excess toner from its surface.

The arrows 50 on the backup rolls 40 represent the withdrawal of this roll when a particular fountain is not in use so that recording medium 16 will pass over the fountain out of engagement with the applicator roll 42. For this purpose, the axis of drying roll 44 is at a higher vertical elevation than the axis of the applicator roll 42. If a particular backup roll 40 is in its retracted position, the medium surface 17 will not be in contact with the corresponding applicator roll 42 and will move over above this roll in contact with rolls 22 and 44. The movement 50 of the backup roll 40 may be accomplished, for example, by hydraulic lifters (not shown).

Each fountain 26-32 is provided with a particular liquid toner color component. For example, fountain 26 may contain black liquid toner, fountain 28 may contain magenta liquid toner, fountain 30 contains cyan liquid toner and fountain 32 may contain yellow liquid toner. For purposes that will become more apparent in later description of this embodiment, fountain 26 containing black liquid toner is longer in length than the other three fountains 28-32 as illustrated in FIG. 2. In other words, fountain 26 is capable of toning recording medium surface 17 from one edge to the other while the other fountains 28-32 are only capable of toning the region 15 which is the general field for the deposit of component latent images on surface 17 of the recording medium.

Reference is now made to the recording station 12, which is described only in general detail, as its particular design is not dependent on the claimed invention. Station 12 comprises a recording or writing head 48 having one or more aligned rows of writing stylus electrodes 50 supported in a dielectric support 52. Oppositely opposed but in alignment with the electrodes 50 is an aligned row of backup electrodes 54. An example of such an electrode means 50/54 is disclosed in U.S. Pat. Nos. 4,042,939 and 4,315,270. Writing electrodes 50 are electrically coupled to write driver logic and timing circuit 56 by means of conductor harness 58 while backup electrodes 54 are electrically coupled to circuit 56 by means of a group of conductors 60.

It will be apparent to those skilled in the art that other electrode arrangements for station 12 may be used with apparatus 10. For example, the writing electrode with adjacent complementary electrodes disclosed in U.S. Pat. No. 3,653,065 may be employed in lieu of the arrangement shown in FIG. 1.

Since apparaus 10 provides for medium 16 to be rewound rapidly onto supply roll 18, it is desired that a pneumatic, hydraulic or electrochemical lift 53 be provide for the backplate assembly of backup electrodes 54. Electrodes 54 are lifted up out of position and away from the writing electrodes 50 when writing is not occuring and the medium is in the fast REWIND mode, termed MODE M3.

Encoder 62, backed by roller 64, is adapted to run with the moving medium and may be positioned at any convenient location along the medium path through apparatus 10. The output of encoder 62 is supplied to write driver logic and timing circuit 56 via line 66 as well as write time adjustment circuit 86 and head $\theta$ position control circuit 80. Encoder 62 provides a series of pulses per revolution, each pulse representative of an incremental distance of medium movement.

Incoming data for application by circuit 56 to electrode means 50/54 is supplied from a host computer at input 90 to data buffers 92. Buffers 92 represent various buffer delay logic for the purpose of holding two or more lines of data to be presented to the writing electrodes 50 under the control of circuitry 56. The output of buffers 92 is presented on bus 94 to circuit 56. Circuit 56 includes circuitry for data buffer control via lines 96, write timing, high voltage supply, writing electrode (nib) drivers, backup electrode (backplate) drivers. The operation of this circuitry and the details concerning the circuit logic as well as the overall system control can be found in the 8000 F Series Electrographic Film Plotter Operating Manual, Volumes 1 and 2, published in 1981 and available from Versatec, Inc. of Santa Clara, Calif.

The output line 98 from the data buffers 92 is a signal that represents the buffer states, i.e., whether or not the buffers are filled with incoming plot data. This status is supplied as an input to velocity control circuit 100 which, based upon buffer status, supplies medium velocity and direction commands to drive servo control 108 via line 102. Drive servo control 108, in turn, drives and controls the speed and direction of drive motor 23 via line 110. Control 108 maintains precise motor speed by utilizing a speed servo loop including tachometer 112, the output of which is connected to control 108 via line 114. Details of the operation and logic circuitry for drive servo control 108 is disclosed in the above mentioned 8000 F Series Operating Manual, Volumes 1 and 2.

Drive servo control 108 drives motor 23 dependent on the rate of incoming data to be presented to the writing electrodes 50. As such, this control is termed coarse X adjustment in providing a plurality of different forward medium velocities based upon the amount and status of data available for presentation via circuitry 56 to writing electrodes 50 and forming deposited scan lines of data on medium 16 upon sequential operation of the series of backup electrodes 54 as the medium is stepped forward in a manner well known in the art and disclosed in Volumes 1 and 2 of the 8000F Series Operating Manual, supra.

As shown in FIGS. 1 and 2, pairs of photosensors X, Y, X', and Y' are positioned adjacent to the medium 16 between the recording station 12 and the developing means 14. These photosensors are actually pairs of photodiodes coupled at their cathode to a source of positive bias. Photosensor X comprises photodiodes 1X and 2X, photosensor X' comprises photodiodes 1X' and 2X', photosensor Y comprises photodiodes 1Y and 2Y and photosensor Y' comprises photodiodes 1Y' and 2Y'. These photosensors need not be positioned at the "down stream" side of recording station 12 as shown in FIG. 1. They may also be positioned at the "up stream" side between encoder 62 and recording station 12. While their position adjacent either side of station 12 is acceptable, it is preferred that they be in close proximity to station 12 in order to fundamentally be corrective of of medium dimensional changes occurring in the medium in close proximity to head 48 at any given time.

Photosensors X, Y, X', and Y' also each include their own light source directed toward the medium surface 17. However, photosensors X, Y and photosensors X', Y' may share a single light source. In any case, the light sources are not shown in the Figures.

As shown in FIG. 2, the photosensors X, Y, X' and Y' are physically mounted on a frame 68 upon which is mounted the writing head 48. The photosensors are positioned beneath the surface 17 of medium 16 in a manner to be substantially aligned with the tracking indicia 120, as indicated by dotted lines 119. Tracking indicia 120 comprises a series of edge tracking marks 122 and 124 and two tracking lines 126 and 128. Sensor X is in a position to sense tracking marks 122. Sensor Y is in a position to sense tracking line 126, sensor X' is in a position to sense tracking marks 124 and sensor Y' is in a position to sense tracking line 128. As the surface 17 of medium is drawn over the head 48 and writing electrodes 50, the sensors X, X', Y and Y' and connected signal processing circuitry can monitor the indicia and utilize the information for various machine functions, such as, lateral or Y direction positioning of the head 48, angular rotation or theta ($\theta$) positioning of the head 48 along the Y axis of medium 16.

As shown in FIG. 1, sensors Y and Y' have their respective outputs 70 and 72 connected to head Y position control 78. Sensors X and X' have their respective outputs on lines 74 and 76 connected to circuit 77 comprising initial signal processing circuitry for the X and X' sensors (FIG. 12) and start plot logic circuit 282 (FIG. 13). The X and X' processed signals are respectively placed on output lines 315 and 316 from circuit 77 to head $\theta$ position control 80 and to write timing correction 82. Head Y position control 78 has an output 83 connected to Y stepper drive motor 84 and a second output 87 connected to the write driver logic and timing circuity 56. Head $\theta$ position control 80 has a output 85 connected to head $\theta$ stepper drive 86. Write timing correction 82 has an output 88 connected to the write driver logic and timing circuitry 56.

As shown best in FIG. 2, Y drive servo motor 84 is mounted on frame 129 and has a drive shaft 130 coupled to a sprocket 131. A corresponding idler sprocket 132 is mounted to rotate on shaft 133 secured to frame 129. Sprockets 131 and 132 are linked together by the band or belt 134. Band 134 is secured by arm 135 to frame 68. Head frame 68 is mounted via bearing supports 136 to move laterally or in Y direction relative to frame 129. It can be seen that frame 68 with head 48 will move in either Y direction, as indicated by arrow 137, in response to step movements by servo motor 84 via lateral movement of band 134 connected to frame 68.

Head $\theta$ drive servo motor 86 is supported from machine side frame 140 and has an eccentric 141 supported on the end of its shaft, as illustrated in FIG. 2. Eccentric 141 is positioned in a slot 143 in one end of frame 129. This frame end is supported from side frame 140 by means of support 139 for $\theta$ movement as indicated by arrow 144 upon rotation of eccentric 141.

The other end of frame 129 is pivotally mounted from support 145 secured to the machine side frame 142. The point of pivot for $\theta$ movement 144 is at 146. It can be seen that frame 129, along with frame 68, will move about pivot point 146, as indicated by arrow 144, in response to step movements by servo motor 86 via rotational movement of eccentric 141 in slot 143.

Both frames 68 and 129 are provided with optical limit switch devices 150 and 152 indicative of the maximum limits of thir respective directional movement in opposite directions. Limit switch devices 150 and 152 comprise pairs of optical sensors and light sources indicated at 151 and 153 for each drive. The path of light from the source to the sensor is broken by the passage of a respective flag 154 and 156 indicating that a maximum limit has been reached. Each sensor/light pair 151 and 153 has two output lines representing opposite maximum limits; for device 150 these are lines 157A and 157B and for device 152 these are lines 158A and 158B.

Figure 18:
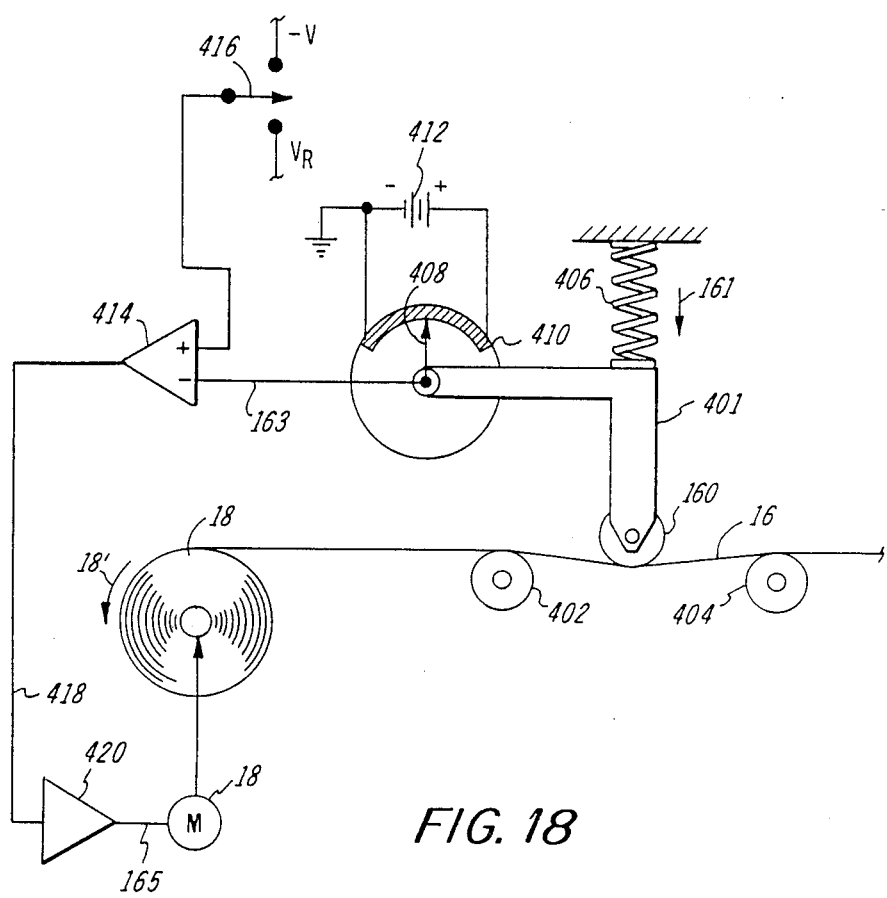
FIG. 18 is a detailed schematic diagram of an embodiment for the tension servo control shown in FIG. 1.

Referring again to FIG. 1, adjacent to the payout of medium 16 from supply roll 18 is dancer roll 160, which is supported in a conventional manner to provide predetermined level of bias on medium 16 indicated by arrow 161. Means 162 is provided to monitor the applied predetermined tension on dancer roll 160. Means 162 may be an optical sensor positioned to determine relative vertical movement of dancer roll 160. On the other hand, means 162 may be an electrical sensor to determine such movement. Such an embodiment is illustrated in FIG. 18, which will be discussed later. Means 162 is connected by line 163 to tension servo control 164. Control 164, which includes a motor drive control (not shown), is coupled via line 165 to supply roll motor 19.

The function of dancer roll 160 is to ensure that a predetermined amount of tension is applied to medium 16 as it is paid off of supply roll 18. The servo control 164 can monitor changes in the desired tension and either increase or decrease the back torque on motor 19, as the case may be, for correcting to the desired level of medium tension.

Figure 5:
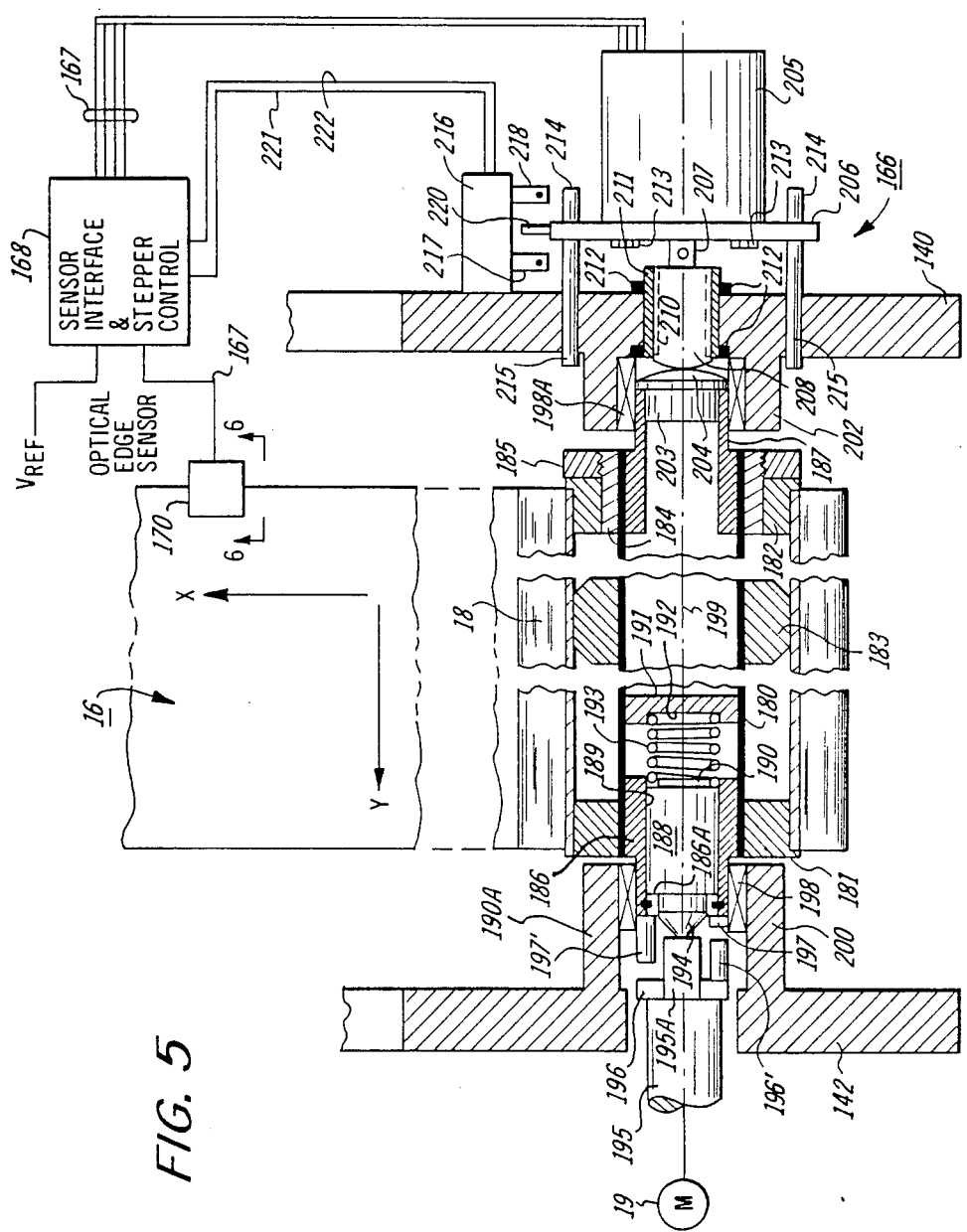
FIG. 5 is a schematic diagram of the means for lateral translation of the medium supply roll in the apparatus of FIG. 1.
Figure 14:
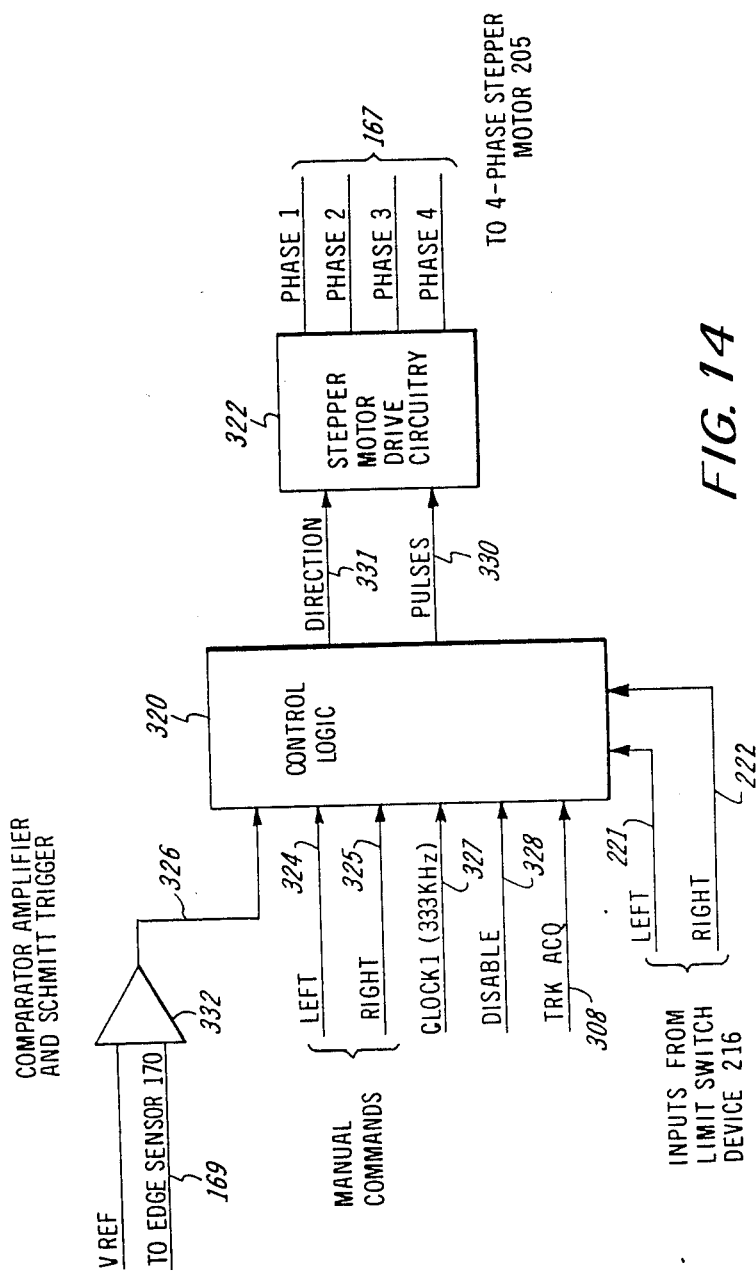
FIG. 14 is a circuit diagram for the medium guide servo control in FIG. 1 to provide lateral translation of the medium supply roll.

Coarse Y adjustment for medium 16, i.e., lateral adjustment of medium position relative to head 48 is achieved by a supply roll position actuator 166 shown in further detail in FIGS. 5 and 14. The actuator 166 includes a step servo motor which receives input from the medium guide servo control 168 via supply lines 167 to move the supply roll 18 laterally in either Y direction. An optical edge sensor 170 monitors the edge of medium 16 and supplies an input signal via line 169 to guide servo control 168 indicative of which direction the supply roll 18 should be laterally moved for desired medium alignment. While the tension servo system implementation has been shown in apparatus 10, it has been found not to be essential in apparatus operation, as the tension torque applied in oppositely opposed directions by drive roll motors 19 and 24 has been found generally sufficient for providing any necessary medium tension.

Between recording station 12 and encoder 62 is a corotron 63 that extends the width of medium 16 in the Y direction. Also, there is shown in FIG. 1 a similar corotron 65 between fountain 32 and drive roll 13. Corotrons 63 and 65 aid in the removal of residual charge from the medium surface 17 by applying a charge of opposite polarity to that provided by writing electrodes 50. In this manner a new latent component image may be formed at recording station 12 without any interference from previously deposited electrostatic charge from the creation of the previous image forming pass of the same medium section through station 12. Either one corotron or both corotrons 63 and 65 may be employed to perform this function. While corotrons 63 and 65 have been shown to be helpful in improving image quality, they are not considered to be essential to the operation and performance of apparatus 10.

Having made reference to head Y position control 78, head $\theta$ position control 80, write timing correction 82, medium guide servo control 168, and drive servo control 108, their funtional purposes in the operation of apparatus 10 should be realized at this point. Control 108 may be referred to as providing a coarse X adjustment since the rate of X direction movement of medium 16 is controlled by control 108. Control 168 may be referred to as providing a coarse Y adjustment since the lateral Y translation of medium 16 in the medium path through apparatus 10 is controlled by control 168. Head Y position control 78 and its accociated head drive 84 may be referred to as fine Y adjustment while head $\theta$ position control 80 and its associated drive 86 may be referred to as fine $\theta$ (rotational) adjustment. Write timing correction 82, supplying correction pulses to advance or delay the firing sequence of electrode means 50/54, may be referred to as the fine X adjustment. These fine adjustments are adapted to make fractions of a mil adjustments while the coarse adjustments are generally adapted to make adjustments of one or more mils.

It is not essential to functionally employ these three fine adjustments at the same time in the operation of apparatus 10. For example, in some cases for Y direction adjustments, the coarse Y adjustment may be sufficient in lieu of making any fine Y or $\theta$ adjustments. Also, the fine Y or $\theta$ adjustments may be independently utilized, one without the other. Most recent results show that the coarse Y and fine X and Y adjustments may provide the preferred combination for medium compensation.

Figure 3A:
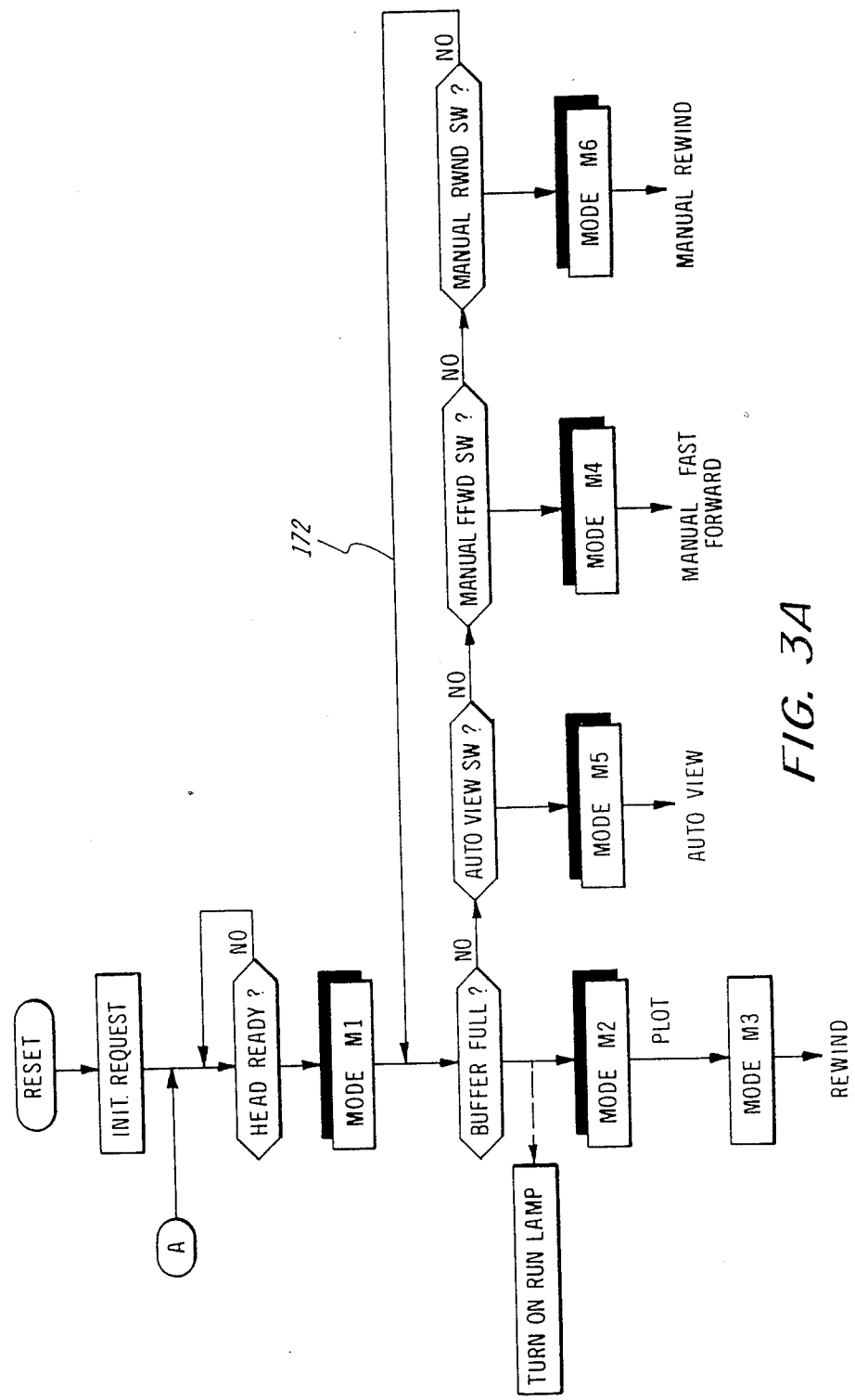
FIG. 3A is an overview flow diagram for the operating modes of the apparatus comprising this invention.
Figures 1, 3B:
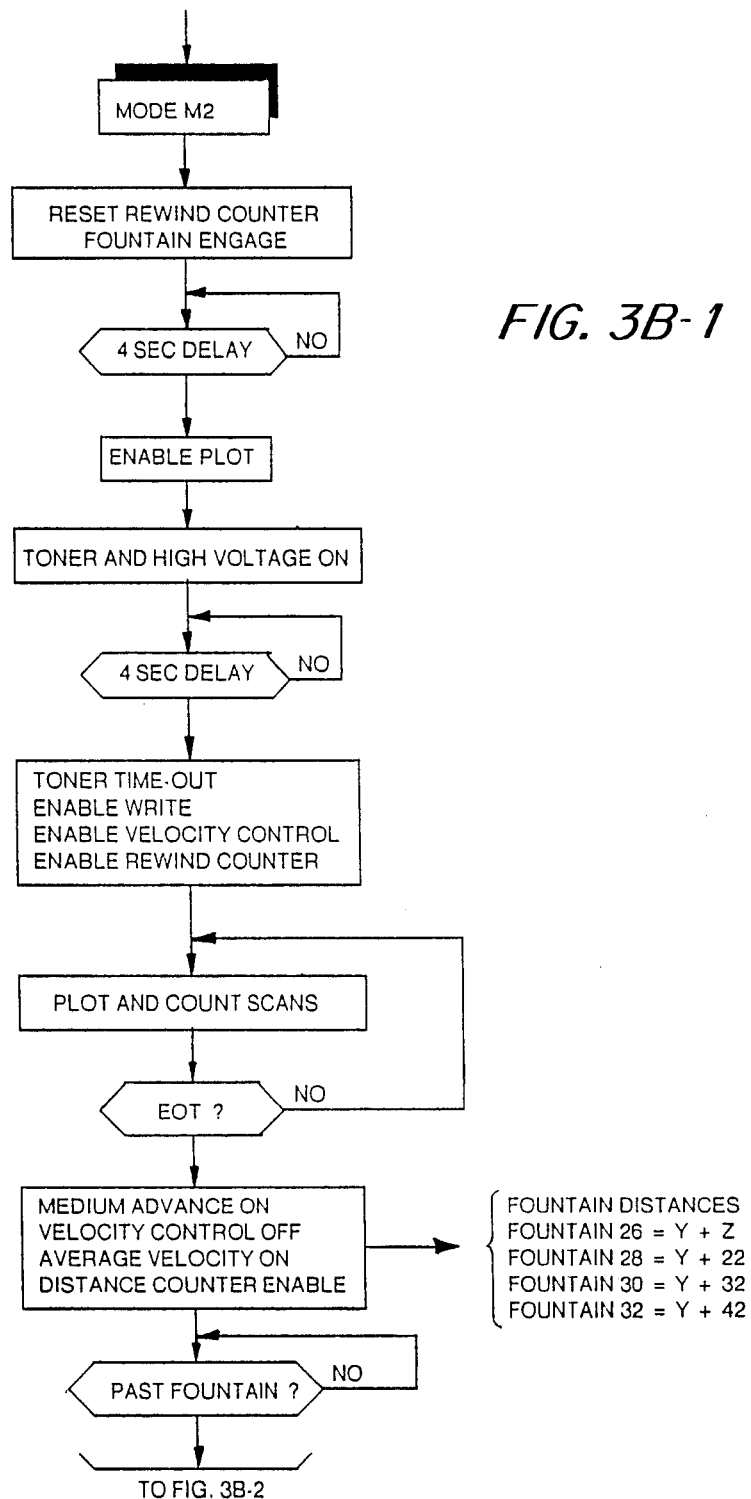
Figure 3C:
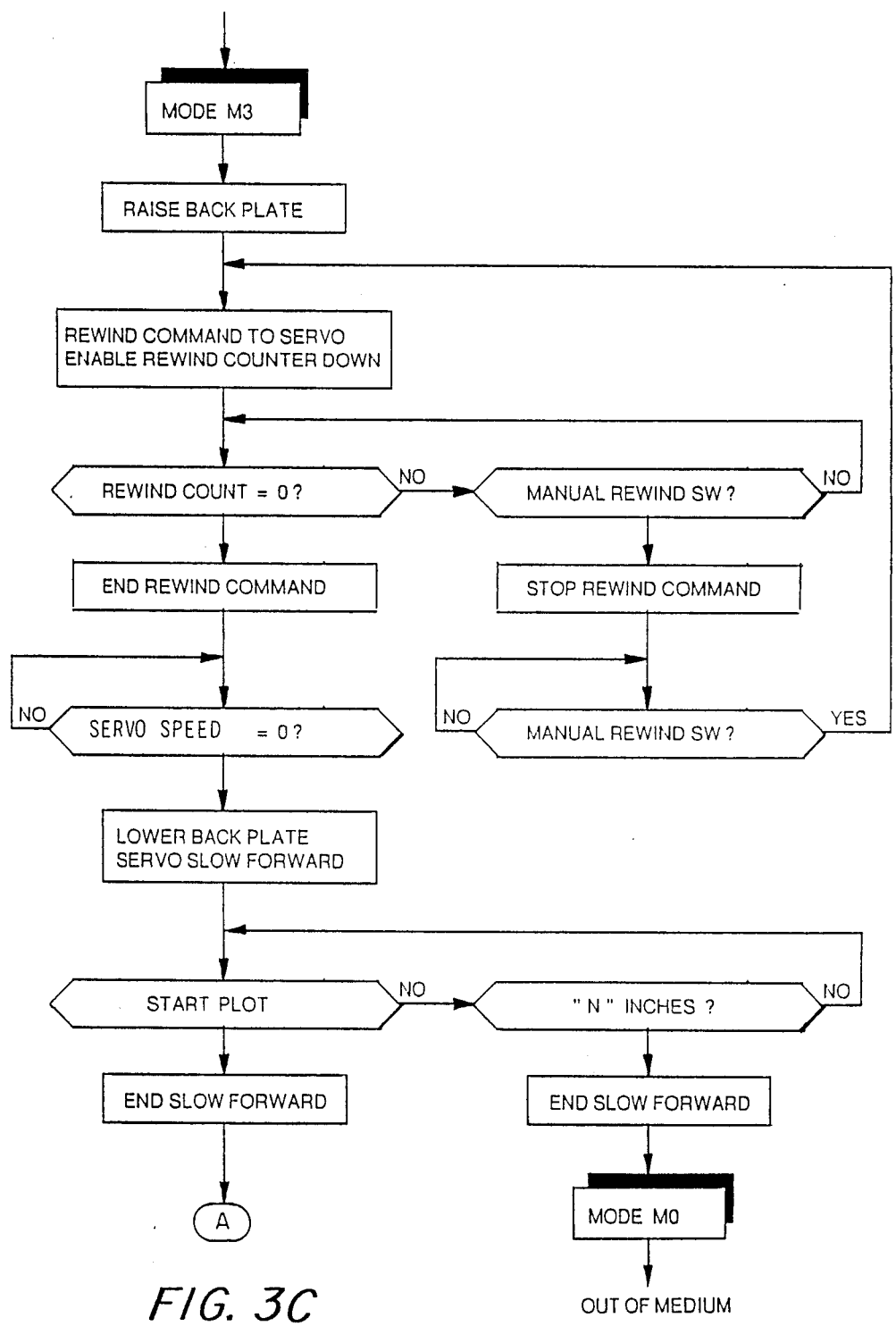
FIG. 3C is a flow diagram of the REWIND or MODE M3 for the apparatus comprising this invention.

Having explained apparatus 10 in broad detail, reference is now made to FIGS. 3A, 3B and 3C to explain the general operation of apparatus 10. In FIG. 3A, various machines operating modes are depicted. These modes are MODE M1 rtelates to a scan monitoring condition to determine if various other modes are to commence operation. MODE M2, PLOT, is the main operational mode for apparatus 10 for forming a plot or a component plot in the field 15 of the recording medium. This mode becomes automatically operational if a "buffer full" condition in MODE 1 is positive, i.e., the data buffers 92 are filled with data for presentation to the writing electrodes 50. MODES M4, M5 and M6 are manually initiated modes. MODE M4 initiates continuous fast forward movement of the medium 16 onto take-up roll 24 until, stopped by deactivation of MODE M4. MODE M5 enables manual advancement of the medium 16 a predetermined amount of distance for immediate viewing of a plot. MODE M6 enables manual rewind of the medium 16 upon each actuation of MODE M6.

The operation of apparatus 10 is as follows. Upon startup, the circuitry is reset and INIT REQUEST is initiated, i.e., the head Y position control 78 and/or $\theta$ position controls 80 are activated to respectively bring about centering of head 48 and positioning head 48 parallel to the Y axis or $\theta$=zero. This is accomplished by the position control logic circuit 340 in FIG. 15. After these conditions have been met, as indicated by HEAD READY=yes, MODE M1 is initiated. MODE M1 is a scanner mode wherein determination is made as to whether the data buffers 92 have recieved data or have been filled with data. If not, any one of the manual MODES M4, M5 and M6 can be initiated. If none are activated, MODE M1 continues in a scan loop 172, shown in FIG. 3A, until one of three manual modes is initiated or the data buffers are filled with data.

If the data buffers are full (BUFFER FULL=yes), then apparatus 10 is switched to the PLOT, MODE M2, which is visually indicated as operational by a run lamp.

FIGS. 3B-1 and 3B-2 show the flow diagram for MODE M2. First, a rewind counter is reset to zero to keep track of the amount of medium paid off supply roll 18 to form a plot. Secondly, one of the fountains 26–32 is selected and is positioned to be in operating position with the medium 16. This entails the lowering of the appropriate backup roll 50. In the case of a vacuum fountain, this would entail the raising of the fountain into engagement with surface 17. A four second delay is enabled to provide sufficient time for this function. Third, the feeding of data from buffers 92 to circuitry 56 is enabled (ENABLE PLOT) followed by the enablement of toner flow at the selected fountain and the application of appropriate high voltages to the recording station 12. A four second delay is enabled to provide sufficient time for these functions to be performed. This delay is followed with what is termed TONER TIME-OUT. While the data buffers 92 may be filled with data and apparatus 10 is ready to write, ENABLE WRITE is not initiated for several further seocnds, e.g., 3.5 seconds, to ensure that the toner is available at the selected toner fountain. The toner system will remain on beyond the first time-out period for a further period of time, e.g. 9 seconds, if the buffers 92 are now empty and further data is not received by buffers 92 from the host computer or data is not presented to the the electrode means 50/54 for writing due, for example, to some malfunction in the system control or some machine function not yet in a ready state for operation. After the time-out period has expired, the toner system will turn off. Reciept of new data or malfunction correction will permit the selected toner fountain to be turned on again and the above described delay sequence is repeated to ensure that the toner is available at the selected toner fountain.

Next, writing voltages for the first line of data is established at the writing electrodes 50 (ENABLE WRITE) by circuitry 56, the velocity control 100 is enabled and rewind counter is enabled. At this time the forming of scan lines of data are presented at the electrodes 50 while the backplate electrodes 54 are sequentially fired off to form the latent scan line on medium 16. The function of presenting scan lines of data and counting out the scans to be presented via circuitry 56 is carried on until an end of transmission (EOT) is received from the host computer (EOT=yes). This command terminates the operation buffer loading and permits all previously loaded buffers to be outputted in sequence.

Since velocity signals had been supplied from control 100 based upon the conditions and content of buffers 92, the medium advancement is continued at an average speed command on line 102 based upon the average speed command provided for a predetermined number of previous scan lines of data to ensure continuous running operation to finish the plot and emptying all data buffers. In order to perform these functions, the velocity control is shut off and the medium is advanced based upon this calculated average velocity. As the distance counter is enabled based upon the distance between the end of the plot at this point and end of the last fountain 32 to ensure complete toning of the deposited latent image. When the plot has been advanced past the last fountain (PAST FOUNTAIN=yes), another TONER TIME-OUT is initiated. This TONER TIME-OUT is for a period of time without the receipt of data and ahile the toner system to the selected fountain remains on. This TONER TIME-OUT period may be 9 seconds. After the time period has transpired, the toner supply to the selected fountain is turned off and the high voltage supply to the recording station 12 via circuitry 56 is turned off.

At this time the drying roll 44 of the selected fountain (or the vacuum channel of the vacuum type, as the case may be) is maintained in an "on" condition to continually dry the toned medium surface 17. The medium is moved a sufficient distance X to ensure that the remaining latent image of the plot is completely dried. After the medium has moved the distance X, the backup roll 50 of the selected fountain is withdrawn. In the case of the vacuum fountain, the selected fountain would be lowered away from the medium surface 17.

It should be noted that enablement of the distance counter and the decision making of the PAST FOUNTAIN function is accomplished based upon which of the four fountains have been selected. Each of the four fountains is a different distance from recording station 12. If the distance between fountain 26 and station 12 is Y inches and the width of each fountain 26–32 is Z inches, then the distance counted off by distance counter is based upon the selected fountain and its distance from station 12 as indicated in FIG. 3B-1.

After disengagement of the selected fountain, a predetermined count is enabled to make sure that all portions of medium surface 17 that have been subjected to liquid toning are dried. Since toning is continued on medium surface 17 for a short distance beyond the termination of the plot, the medium will be wet in this tailing nonimage field. The wet medium can cause shocking conditions at the head electrodes 50 after medium rewind and the commencement of the next MODE M2. Thus, the medium is moved T inches for drying the medium surface after fountain disengagement. At this time, the drying function, albeit applicator roll 44 on a vacuum channel, is turned off.

At this time, the head frame 68 may again be recentered (INIT REQUEST) to its predetermined center position, although this fountain may not necessarily be repeated. The end of transmission (EOT) detect is reset. If EOT is not to be set (EOT SET=no) then there will be no rewind function, MODE M3, and the necessary resets are accomplished for continuation of plotting, i.e., engagement of the selected fountain, reset of EOT and reset of MEDIUM ADVANCE for counting the length of the next plot. The machine then is returned to checking of the head and MODE M1, for determination if there is a new data coming in from the host computer and the buffers 92 are full.

If EOT is to be set (EOT SET=yes) i.e., there is an indication that the plot just completed requires additional data to be written in a superimposed manner, then the machine function will check if there is to be a monocolor or multicolor plot. If a monocolor is involved, the machine will revert to the functions performed when EOT SET=no. If there is a multicolor plot comprising several superimposed color component images, EOT is reset for the next superimposed plot, the medium advance is reset to, and the rewind count determined for the previous plot is stored for reuse during creation of the next superimposed plot. The medium advance for reset is to set the velocity of the drive motor 23 to zero.

At this point in time, MODE M3, REWIND, is functionally brought into operation. MODE M3 is illustrated in the flow chart diagram of FIG. 3C.

The first function accomplished in MODE M3 is that the backplate assembly of backup electrodes 54 is raised out of write position via lifter 53. Next, a rewind velocity and direction command is issued to drive servo control 108 and the rewind counter countdown is enabled. At this time, the medium paid out on take-up roll 24 is rewound at a fast rate onto the supply roll 18. The stored rewind count is monitored until the rewind count is equal to zero indicating that the full amount of the medium previously paid out has been fully rewound on roll 18.

In FIG. 3C, manual rewind functioning is shown so that a machine operator may interrupt the automatic rewind function and manually control this function. If the manual rewind function is stopped, this function will not continue but rather its reindication will cause automatic rewind funtioning to take place enabling drive servo control 108 to rewind the medium the distance determined in the count present the rewind counter for complete count down.

Figure 7:
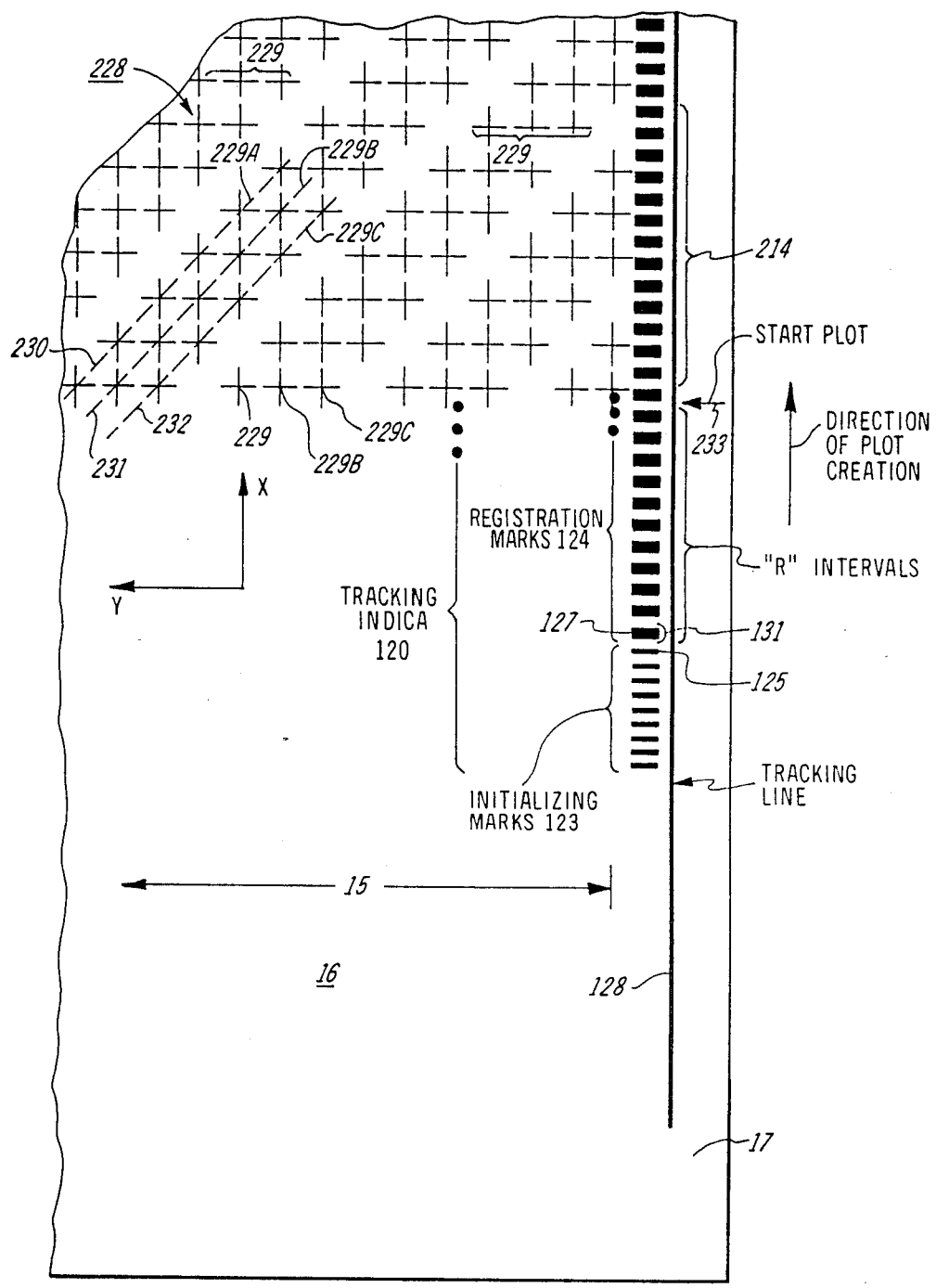
FIG. 7 is a plan view of portion of a recording medium section illustrating tracking indicia and a portion of a color composite image.

After the count down has succeeded to rewind count equal to zero, an end of rewind command is issued and drive servo motor 23 is turned off. After the medium has come to a complete stop (servo speed=zero), the backplate assembly is lowered into position at station 12. Next, a command is issued from velocity control circuit 100 to move the medium forward at a preselected slow rate. A START PLOT indication is interrogated and if affirmative, the START PLOT functioning of start plot logic circuit 282 in FIG. 13 is initiated, the START PLOT point 233 located, the medium is moved so that the START PLOT point located on the medium being equal to a set number of "R" wide registration mark intervals 131, as depicted in FIG. 7, thereby positioning point 233 to be aligned with the first line of electrodes 50. At this time the medium is stopped (END SLOW FORWARD in FIG. 3C). The apparatus 10 is again set for the enable PLOT and WRITE functions for MODE M2. Head prepositioning may be rechecked at this time and if MODE M1 is attained with an affirmation of a BUFFER FULL condition, MODE M2 is reinitiated and functioning continues in the manner as previously explained.

If START PLOT indicates a not ready condition, then interrogation is repeated. If, during this interrogation "N" inches or less of medium 16 is present on supply roll 18, a MODE M0 will be initiated indicating "out of medium" condition.

The formation of each consecutive color component image will be superimposed on the previously formed and toned color component image by employment of registration means yet to be discussed in detail. The next operation of MODE M2 for the next consecutive color component image will bring into operation the selection of another of the fountains 26–32.

Figure 4:
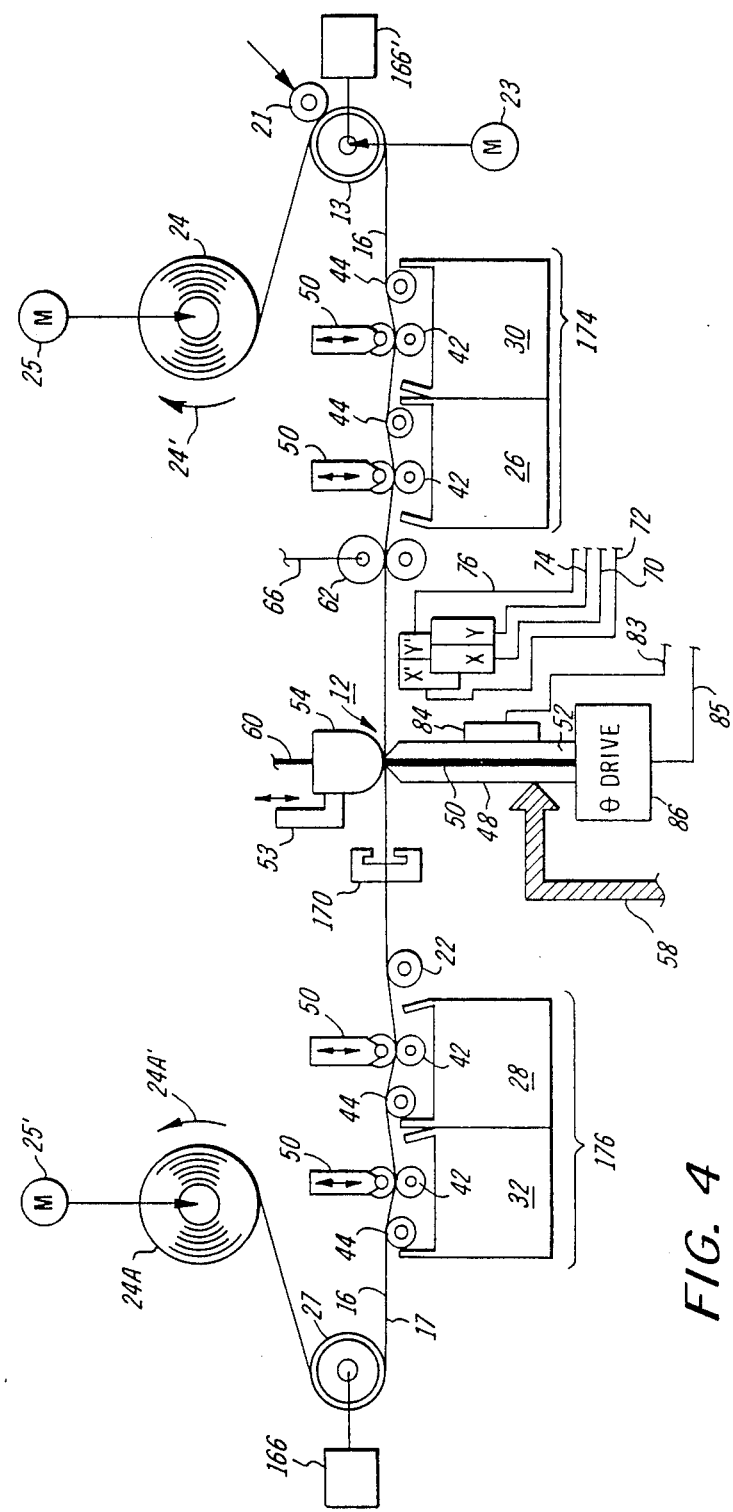
FIG. 4 is a schematic diagram showing a color electrographic apparatus according to another embodiment of this invention.

An alternate embodiment for a consecutive pass color electrographic apparatus is shown in FIG. 4. Apparatus 172 comprises a recording station identical to station 12 and developing means 174 and 176 adjacent each side of station 12. Instead of multiple liquid development fountains adjacent one side of station 12 as shown in FIG. 1, there are two fountains on either side of the recording station. Thus, developing means 174 comprises fountains 26 and 30 while developing means 176 comprises fountains 28 and 32. These individual fountains are same as that disclosed in FIG. 1 except that fountains 28 and 32 are positioned to operate on the medium when moving from right to left upon viewing FIG. 4. Takeup roll 24A is operative to rewind medium 16 via operation of takeup motor 25'. The medium is rewound on roll 24A after passing around idler roll 27.

Takeup roll 24 and drive servo motor 23 are the same as that shown in FIG. 1. Upon velocity and direction commands supplied by velocity control circuit 100, motor 23 will drive medium 16 at a slow rate in either direction for recording at station 12 and subsequent development at either of developing means 174 and 176. The respective motors 25 and 25' maintain an equilibrium state by imposing equal but opposite forces on the medium as represented by the respective arrows 24' and 24A'.

In operation, the medium 16 is first paid out from roll 24A under the operation of PLOT MODE M2 and taken up on roll 24 via servo motor 23. During this operation, a latent image is formed on medium surface 17 followed by development at fountain 26, which is made operational under MODE M2. During payout from roll 24A, position actuator 166, having its input connected to optical edge sensor 170, is operated to provide coarse Y adjustment to medium 16. Also, fine Y and/or fine $\theta$ adjustment may be provided via the operation of photosensors X, Y and X', Y' via head Y servo drive 84 and/or head $\theta$ servo drive 86. After development and drying, completing the first pass, the control of motor 23 is reversed and the medium 16 is paid off of roll 24 again under the operation of PLOT or MODE M2 and taken up on roll 24A via servo motor 23. During this operation, a latent image is formed on medium surface superimposed over the first formed image, followed by development at fountain 28, which is made operational under MODE M2. During payout from roll 24, position actuator 166', having its input also connected to optical edge sensor 170, is operated to provide coarse Y adjustment to medium 16. Also, the fine Y and/or fine $\theta$ adjustments may be provided during this reverse PLOT or MODE M2 operation.

It should be noted that under this reverse direction MODE M2, the information provided to data buffers 92 will be provided in reverse order, i.e., the scan lines will be in reverse order from the entire plot and the data in each scan line will be reversed.

The above process is repeated again for the third superimposed lateral image and development at fountain 30 and the fourth and last superimposed latent image and development at fountain 32.

Figure 6:
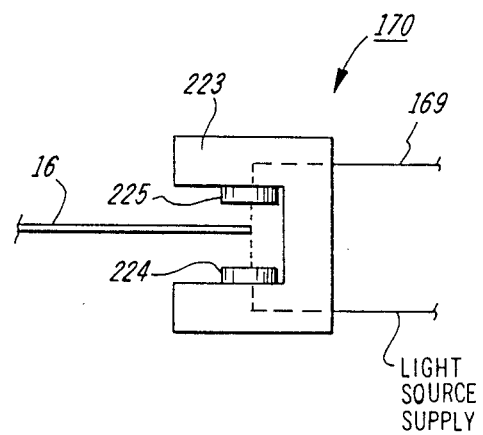
FIG. 6 is a section taken along the line of 6—6 of FIG. 5 showing a side view of the medium edge detector used with the lateral translation means of FIG. 5.

Reference is now made to FIGS. 5 and 6 to explain in further detail the coarse Y adjustment. Supply roll 18 is rotatably supported in side frames 140 and 142 on a structure comprising roll tube 180 having end roll stops 181 and 182. Stops 181 and 182 support roll 18 on tube 180 with the aid of a roll spacer 183. Roll stop 181 is secured to tube 180 while stop 182 is removable. An externally threaded collar 184 is secured to the end of tube 180 opposite to stop 181. Once roll 18 is slipped over tube 180 and guide 183 with its end in engagement with stop 181, the removable stop 182 is slipped over collar 184 and held in position by means of roll nut 185 threaded upon collar 184. In this manner, supply roll 18 is held secured onto tube 180.

Left and right ends of roll tube 180 are provided with a respective bearing support members 186 and 187. Member 186 has a cylindrical passage 189 within which is slidably mounted the roll thrust plunger 188. The rearward extent of plunger 188 is provided with a circular projection 190.

Mounted internally within tube 180 is a plunger spring stop 191. Stop 191 is provided with a circular detent 192. Compression spring 193 is mounted between plunger projection 190 and stop detent 192 to urge plunger 188 out of passage 189. However, plunger 188 is held within passage 189 by means of stop ring 186A.

The forward end of plunger 188 is provided with a pointed projection 194 that contacts the end extension 195A of motor drive shaft 195. Shaft 195 is driven by supply roll motor 19.

Secured to the end of drive shaft 195 is a drive torque coupler 196. Formed on the outer end of bearing support member 186 is a roll coupler 197. Couplers 196 and 197 each have respectively one or more extensions 196' or 197' that will come into engagement with a corresponding complement extension on the other when rotational movement is applied in either direction to shaft 195. Thus, upon rotation of drive shaft 195, a coupler extension 196' of coupler 196 will come into contact with a corresponding extension 197' on roll coupler 197 so that roll tube 180 will be rotatably driven by shaft 195. Biased plunger 188 functions to maintain the couplers 196 and 197 in firm engagement with one another without interfering with the rotary operation of roll tube 180.

Bearing support member 186 is supported in roll sleeve bearing 198, which is supported in mount 190 which is part of side frame 142. Bearing support member 187 is supported at the other end of roll tube 180 in roll sleeve bearing 198A, which is supported in mount 202 which is part of side frame 140.

The end of bearing support member 187 is provided with a plug member 203 having a spherical end surface 204.

It should be noted that the bearing support members 186 and 187 may be supported in U-shaped or open ended bearings 198 and 198A. In this manner, the entire supply roll tube 180 may be easily inserted with its coupler end positioned (intercoupling of couplers 196 and 197) into place on bearing 198 followed by insertion of the other end of roll tube 180 at support 187 on bearing 198A. Spherical end surface 204 will ride smoothly over the forward end of threaded screw 208 due to the bias action of plunger 188. This action eliminates any damage that might be caused to the actuactor 166 upon insertion of the roll tube 180 onto bearings 198 and 198A.

Position actuator 166 comprises stepper motor 205 which is mounted on a frame plate 206 via bolts 213. The output shaft 207 of motor 205 secured to threaded roll drive screw 208. Screw 208 is provided with an external thread of predetermined pitch. An opening 210 is provided in side frame 140 into which is mounted an internally threaded bushing 211 and is secured to frame 140 by means of fasteners 212. Threaded bushing 211 has the same thread pitch as drive screw 208 so that upon rotational movement of motor shaft 207, the drive screw 208 will move laterally away from or against plug member 203 depending on the direction of rotation of shaft 207. In order to provide for this translatory motion, stepper motor 205 must be mounted to move with the translatory motion of drive screw 208. This is accomplished through movably mounted frame plate 206.

Frame plate 206 comprises a flat plate with a pin 214 extending from each plate corner. The pin members 214 are slidably positionable in corresponding openings 215 formed in side frame 140. Operation of motor 205 will cause translatory motion of drive screw 208 along the axis 199 of roll tube 180 so that the supply roll 18 can be positioned in the Y direction for lateral alignment of the medium 16 as it is fed into the recording station 12. This translatory motion can be applied to roll tube 180 independent of the rotational operation of the roll tube 180 by supply roll motor 19 via shaft 195 and the extended couplers 196 and 197.

Limit switch device 216 is mounted on side frame 140. Like devices 150 and 152, device 216 is provided with two optical sensor and light source pairs respectively at 217 and 218. A flag 220 is mounted on the top edge of frame plate 206. Upon continuous operation of stepper motor 205 in either direction, flag 220 will eventually insert the light source beam to a respective sensor causing termination of the operation of motor 205 via medium guide servo control circuit 168. Thus, sensor/light source pairs 217 and 218 represent the maximum limits of translatory motion for actuator 166.

The respective outputs 221 and 222 of sensor/source pairs 217 and 218 are supplied as inputs to circuit 168. As previously indicated, optical edge sensor 170 has its output on line 167 connected to circuit 168.

As shown in FIG. 6, sensor 170 comprises a U-shaped frame 223 with a light source 224 mounted on one leg of the frame in oppositely opposed relation to a photosensor 225 mounted on the other leg of frame 223. Sensor 170 is mounted relative to side frame 140. The sensor 170 is employed in a manner so that it is midway between a position wherein photosensor 225 detects full illumination from source 224, i.e., the medium 16 is not in the path of the light source 224 and a position wherein photosensor 225 is completely blocked off from the illumination from source 224, i.e., the medium 16 is completely in the path of the light source 224.

Circuit 168 performs to basic functions: an optical sensor interface and stepper control. These functions will be further detailed in connection with the description of FIG. 14. In general, the operation of stepper motor 205 is such that upon activation via circuit 168, motor 205 is driven to translate roll tube 180 to the inner maximum limit until flag 220 intersects the light beam of sensor/source pair 217 which stops the operation of motor 205. Motor 205 is then operated a predetermined amount in the opposite direction to the proximate midpoint wherein the edge of medium 16 is halfway over photosensor 225. At this point, flag 220 is about half way between pairs 217 and 218. The sensor interface of circuit 168 includes a comparator having one input from photosensor 225 and another input from a voltage reference, $V_{REF}$. $V_{REF}$ represents in electrical quantity, the coarse Y position desired for medium 16. The voltage value from photosensor 225 via line 169 is compared with $V_{REF}$ to determine if stepper control should be activated to roll readjust the position of tube 180 along the Y direction and reposition the medium edge as the medium is being paid off of supply roll 18. As an example, the magnitude of adjustment of supply roll translation may be plus or minus 10 mils. Stepper motor provides 240 steps revolution of its output shaft. If the thread pitch of drive screw 208 is 10 turns per inch, then one revolution of the output of motor 205 comprises about 2000 steps per inch and each step of motor 205 is 0.5 mil translatory step.

Explanation up to this point has been directed to the structure and operation of apparatus 10 including coarse X and Y adjustments. Explanation will now be directed to the registration means for providing fine X, Y and $\theta$ adjustments at recording station 12. These adjustments are based upon tracking indicia 120 applied to the medium surface 17 during the first pass of the medium 16 through station 12 and developed at developing means 26.

As previously indicated, it has been discovered that it is not necessary that all three of these fine adjustments are conducted concurrently. The fine Y adjustment or the fine X adjustment may be sufficient for image registration purposes without the fine $\theta$ adjustment. In some cases the fine X or fine Y adjustments may be separately sufficient. It is preferred, however, that at least both of these adjustments are applied to make minimal correction for expansion of shrinkage of medium 16 in both X and Y directions.

In order to understand the operation of these adjustments, a sufficient comprehension of the tracking indicia 120 must be first realized.

In FIG. 7, an edge section of recording medium 16 is shown. Within the field 15 of the medium is shown a composite color image or plot 228 comprising a plurality of cross marks 229. Diagonal rows 230, 231 and 232 represent, for purposes of exemplification, the three primary colors of magenta, cyan and yellow, respectively. These color cross marks are produced in three separate passes through station 12 followed by development by a respective color toner fountains 28–30 and 32. The cross marks 229 formed by each pass do not quite touch one another so that a check for their alignment can be visually observed both in the X and Y directions of the medium 16 after the three separate passes have been completed. Thus, cross marks 229A along row 230 are the color magenta, cross marks 229B along row 231 are the color cyan and cross marks 229C along row 232 are the color yellow. All of the cross marks 229A were formed during a separate pass through the apparatus 10 and represents a color component image for magenta. The same is true for cross marks 229B and 229C. Each represent a separate pass forming the cyan component image and the yellow component image, respectively. Of course, in forming full color composite images, the image marks would be superimposed to form desired multicolor images. They are separated into color images in this explanation in order to simplify the discussion thereby lending to easier comprehension.

In practice, a first pass of medium 16 is employed to record the tracking indicia 120 adjacent medium edges followed by a second, third and fourth pass for recording the magenta, cyan and yellow component images followed by a fifth pass for recording a black component image for complete color resolution.

As previously indicated in connection with the description of FIG. 2, tracking indicia 120 includes registration marks 124 and tracking line 128. The registration marks 124 are of equal width and separated by a space equal to their width The marks 124 are employed to determine dimensional changes of medium 16 in the X direction. The tracking line 128, together with tracking line 126 on the opposite edge of the medium 16, are employed to determine dimensional changes of medium 16 in the Y direction.

Mention should be made of the fact that tracking indicia 120 may be preprinted on medium surface 17, although this preprinting preparation of the medium would add to medium costs. It is preferred that indicia 120 be recorded at station 12 and developed at the longer toner fountain 26 during the first pass of the medium prior to the formation of a series of color component images.

Also, it should be realized that as an alternative to printed indicia 120, a series of perforations adjacent one or both edges of medium 16 may be utilized as tracking indicia. In this embodiment, the light source for the photosensors X, X', Y and Y' would be positioned on the top side of the medium in oppositely opposed relation to one or more photosensors. Also, the perforated edges of medium 16 are extended beyond the Y direction or ends of head 48 so as not to pass through the recording gap between the electrodes 50 and 54 and subject these electrodes to shorting conditions during their operation.

Some means must also be provided to determine the precise point wherein each of the composite latent images will begin to be deposited on medium 16. This point is indicated by arrow 233 in FIG.. 7 and is the START PLOT point. This point is calculable by the determination point of the first registration mark 127 after the identification of a series of initializing marks 123 before the beginning of the line of registration marks 124. The initializing marks 123 are used to perform two functions. The first function is to permit the START PLOT circuitry of FIG. 13 to determine if the circuitry is, in fact, identifying purposeful marks formed on the medium, vis a vis other marks, such as scratch marks or foreign marks present on the medium surface 17. Once the circuitry has recognized that it has detected the series of initializing marks 123, then the circuitry can be enabled to determine the plot start point at 233. This determination is made from the transition from the last narrow initializing mark 125 to the first wider registration mark 127. This change of interval spacing is represented by pointer 131. Once this change has been recognized by the circuitry, the point 233 of START PLOT can be precisely determined.

The circuitry is designed to count pulses produced by encoder 62 employed for the timing of the engaging of electrode means 50/54. Pulses are counted between transitions from the point where a pair of photosensors detect a balanced condition of light to the next balanced condition of light. For example, the initializing marks 123 may be one third the size or width of the registration marks 124. This means that for a cycle from one light balanced condition to the next, there will N encoder pulses counted by the circuitry. This is less counted pulses than is detected for the cycle generated from the registration marks which will be about two thirds longer or equal to $N+\frac{2}{3}N$. This difference in the number of counted encoder pulses in transition from mark 125 to mark 127 is employed to determine where the START PLOT point 223 will begin on medium 16.

Figure 10:
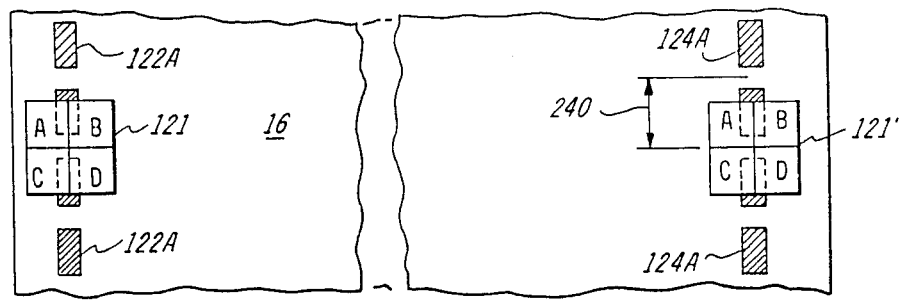
FIG. 10 is a plan view of the same embodiment of tracking indicia as disclosed in FIG. 9 but with a different X and Y photosensor arrangement.
Figure 11A:
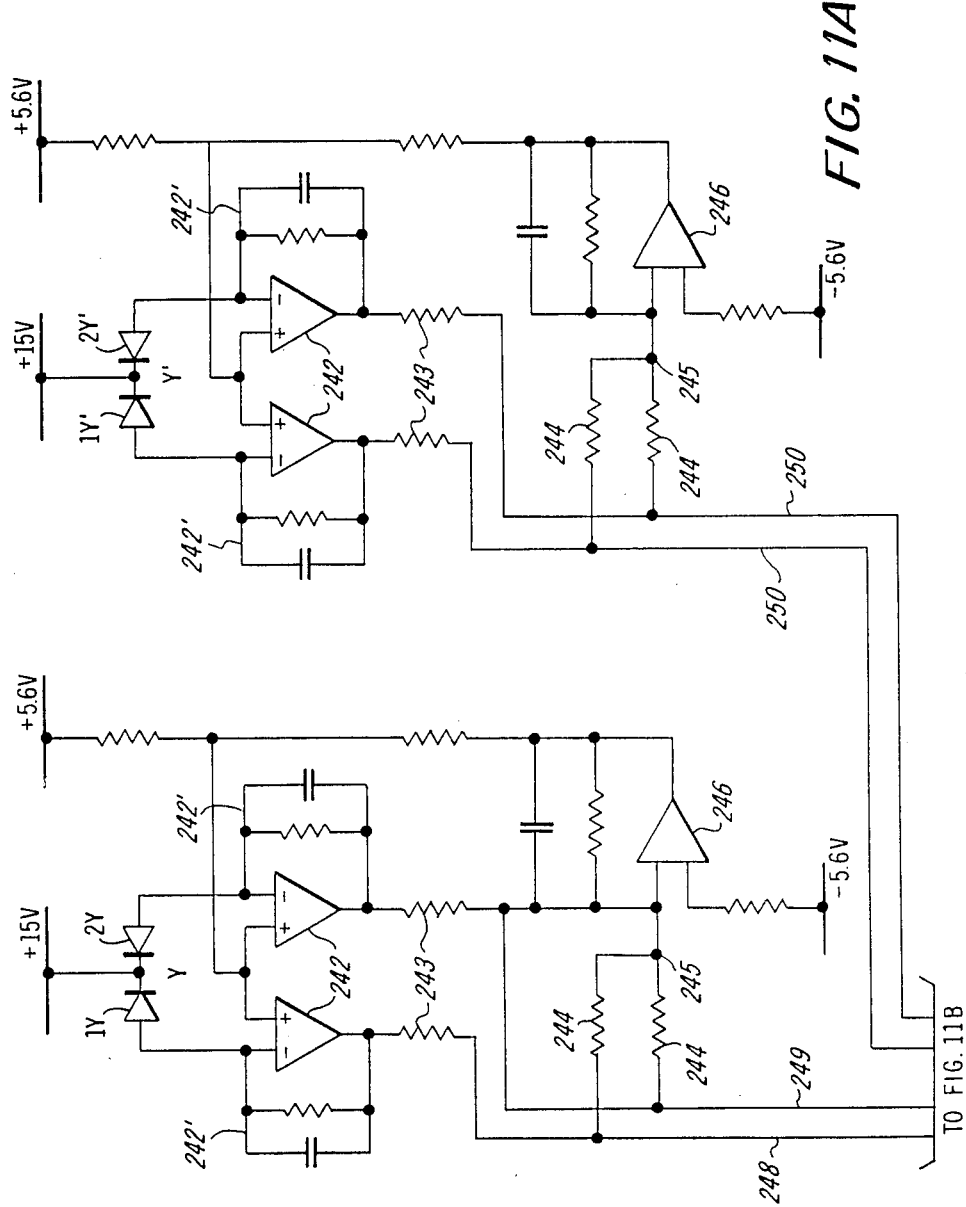
FIGS. 11A and 11B comprise a circuit diagram for the development of electrical signals representative of the output from the Y photosensors.
Figure 11B:
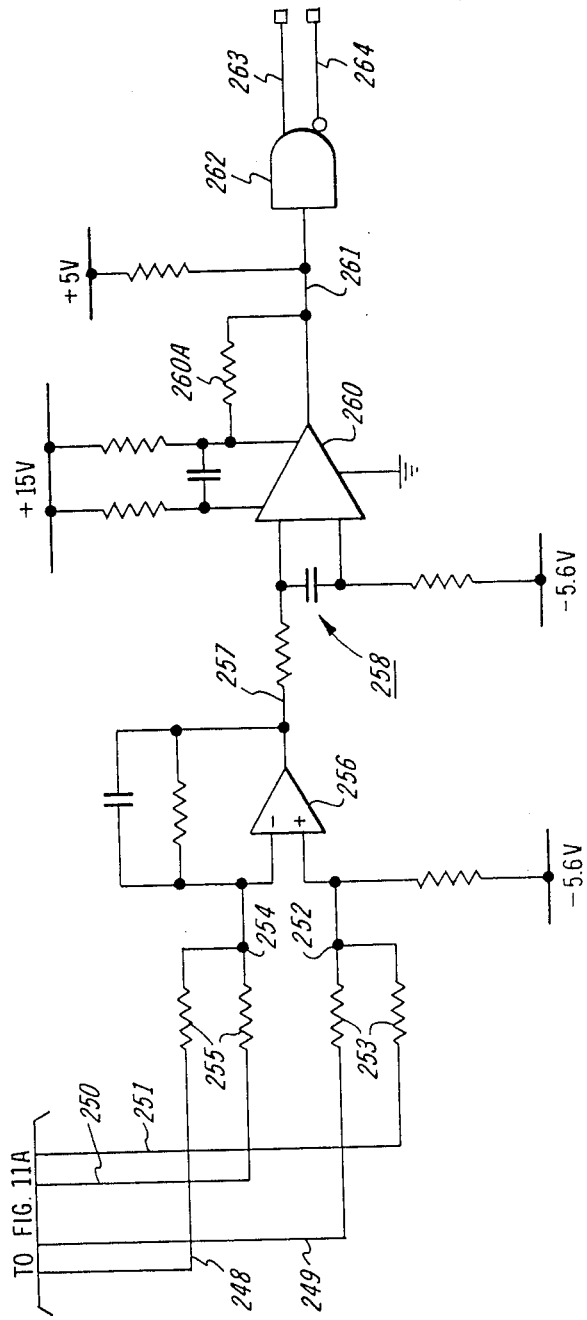
Figure 12:
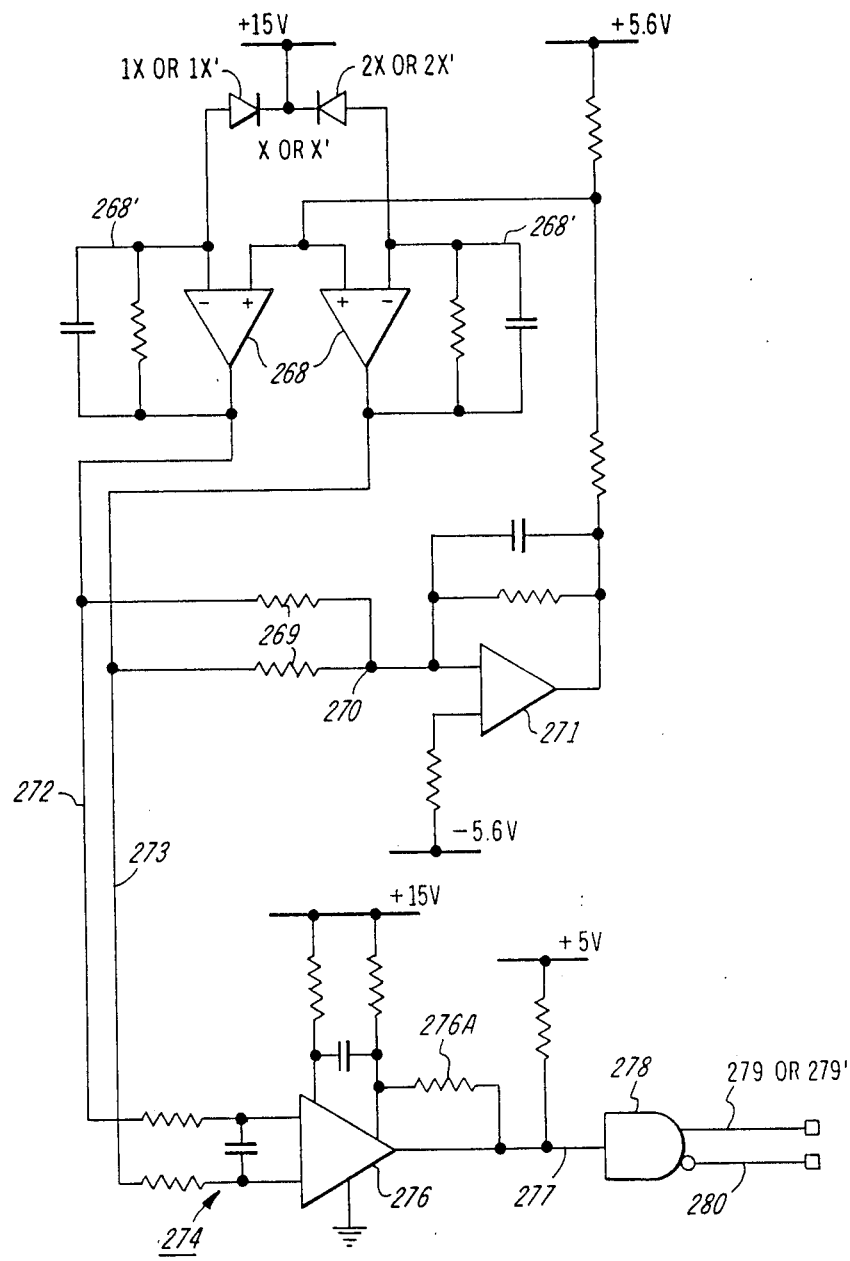
FIG. 12 is a circuit logic diagram for the development of electrical signals representative of the X photosensors.
Figure 13:
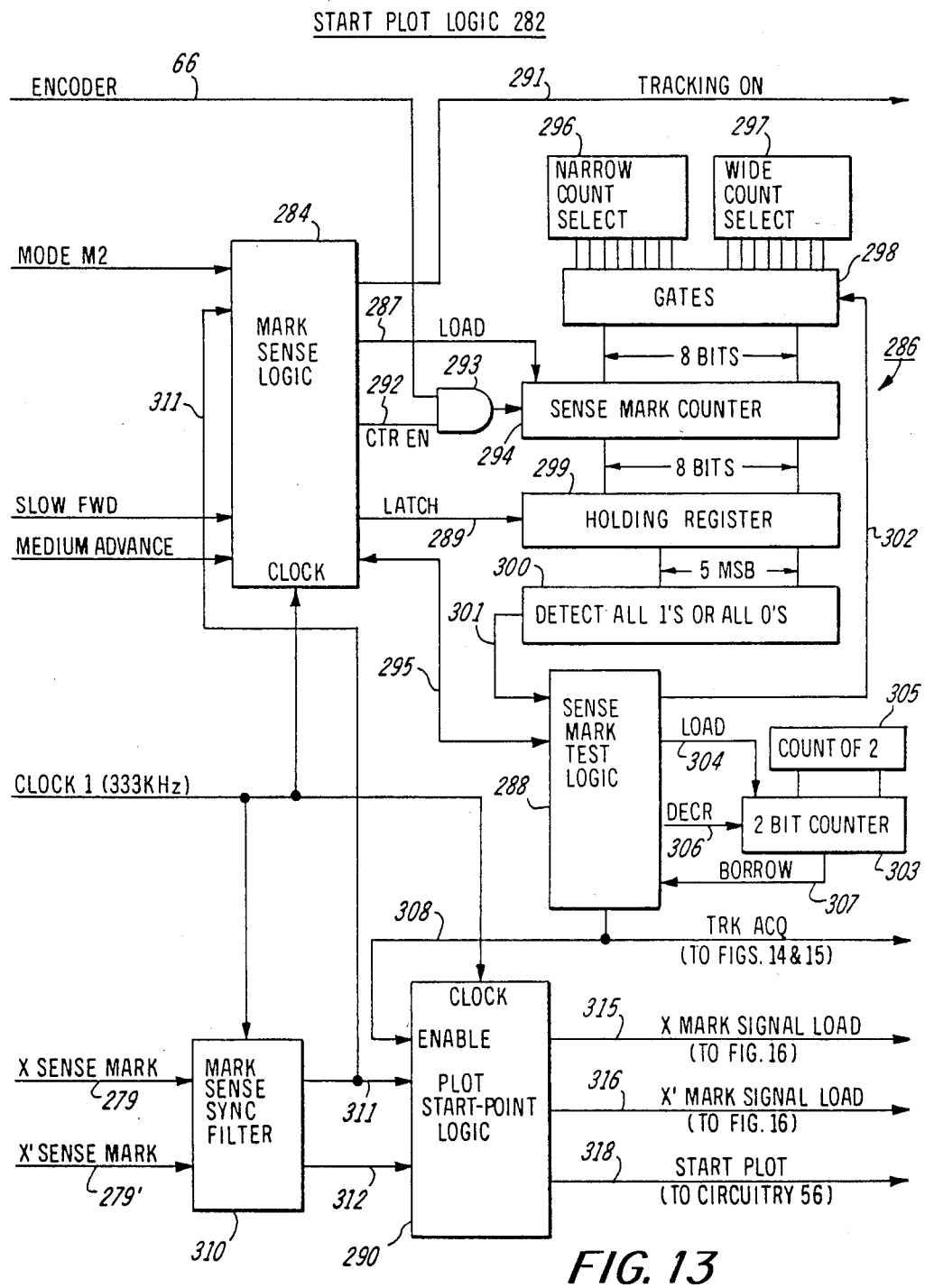
FIG. 13 is a circuit diagram for the determination of the beginning of plot (START PLOT) for the component latent images.

Before discussing circuitry relating to initializing mark determination and START PLOT determination, reference will be made to the relationship of the photosensors X, Y, X' and Y' to the tracking indicia 120 (FIGS. 8, 9 and 10) and the initial photosensor signal processing circuitry for the electrical signals received from these photosensors (FIGS. 11 and 12).

Figure 8:
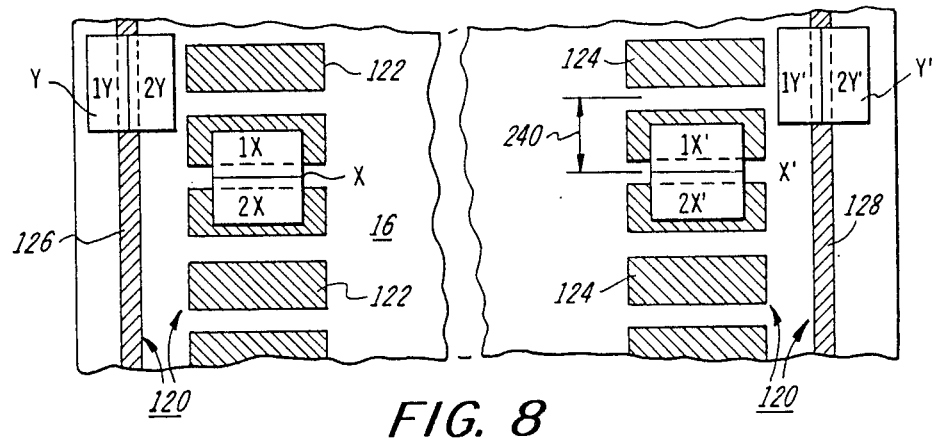
FIG. 8 is a plan view of one embodiment of tracking indicia as applied to the recording medium and as arranged with X and Y photosensors.

The tracking indicia 120 shown in FIG. 2 is shown in enlarged detail in FIG. 8. For determining medium dimensional changes in the X direction, a series of registration marks 122 are needed only along one edge of the medium. With registration marks 122 and 124 provided along both edges of the medium, however, it is believed that improved discernation of such changes may be possible. Also, skewing of the medium along its path through apparatus 10 can be discerned and head $\theta$ (rotational) position changes can be made.

For determining medium dimensional changes in the Y direction, a pair of tracking lines 126 and 128 are provided, one along each medium edge. By monitoring positional changes in the Y direction of line 126 relative to photosensor Y and line 128 relative to photosensor Y', it is possible to determine if the medium 16 has expanded or contracted and then appropriately translate and recenter the head 48 via the head Y position control 78.

To discern dimensional changes in the X direction, the correction circuitry 82 will be constantly counting up encoder pulses from encoder 162 between light balance conditions of an X and/or X' photosensor pair. For example, in FIG. 8, the photosensor pair 1X' and 2X' are shown at this balanced transition point. As the medium moves to the next such transition point, completing a cycle 240, the number of pulses received and from the encoder 62 will be indicative of (1) no dimensional changes (an expected count has been received), (2) a shrinkage of the medium has occurred (an insufficient number below the expected count has been received), or (3) a stretch or expansion of the medium has occurred (a larger amount number than expected count has been received) In the actual embodiment employed, the expected count is 448 encoder pulses within the time of a cycle represented by the distance 240.

To discern dimensional changes in the Y direction, the control circuitry 78 will be monitoring light balance conditions of photosensors Y and Y' so that if these sensor pairs are straddled equally over their respective lines 126 and 128, a balance condition will exist. If the sensor pairs indicate a change wherein either or both sensors 2Y and/or 1Y' sense more light than their companion sensors 1Y and 2Y', then there has been a detected expansion of the medium in the Y direction. Y translation of head 48 will be initiated until a balanced condition is reached relative to the total light received from both the Y and Y' photosensors.

If the sensor pairs indicate a change wherein either or both sensors 1Y and/or 2Y' sense more light than their companion sensors 2Y and 1Y', then there has been a detected shrinkage of the medium in the Y direction. Y translation of head 48 will be initiated until a balanced condition is reached relative to the total light received from both the Y and Y' photosensors.

To discern a skew in the position of medium 16, the control circuitry 80 will be monitoring the light balance conditions along both lines of registration marks 122 and 124. If the count of encoder pulses per cycle 240 differ along one side relative to the other so that there is, for example, a higher expected count on one side as compared to an expected count or a lower than expected count on the other side, then there has been a detected skew. The θ translation of head 48 will be initiated until a balanced condition is reached relative to the total light received from both the Y and Y' photosensors.

Figure 9:
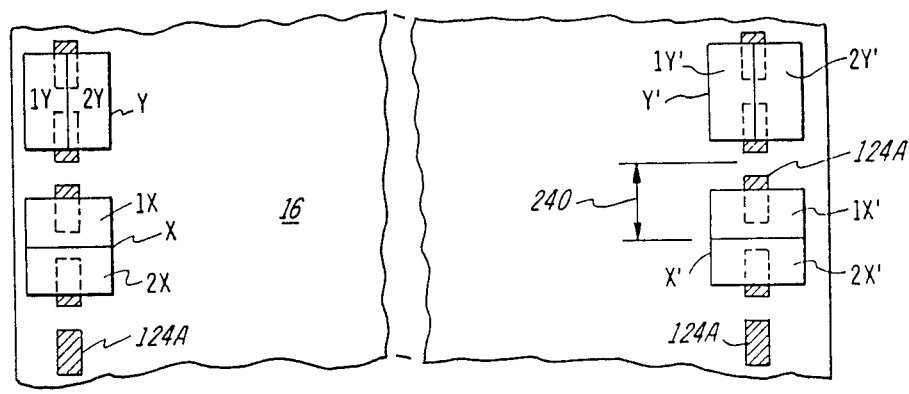
FIG. 9 is a plan view of another embodiment of tracking indicia as applied to the recording medium.

In the alternative embodiment of FIGS. 9 and 10, the tracking lines 126 and 128 can be eliminated and the tracking mark lines consisting of the series of marks 122A and 124A may provide both X, Y and θ monitoring functions as in the case of the embodiment shown in FIG. 8. The Y and Y' photosensors employ the lines of marks 122A and 124A as a means to determine expansion and shrinkage conditions of the medium in the Y direction while the X and X' photosensors employ the spaced marks 122A and 124A to determine the number of encoder pulses occurring per cycle 240 for determination of expansion and shrinkage conditions in the X direction as well as medium skew conditions.

The same lines of marks 122A and 124A are shown in the embodiment of FIG. 10. However, in FIG. 10, photosensors 121 and 121' are quad sensors. The combination of quad sensors 121A and C and 121 B and D; 121'A and C and 121'B and D perform the functions of sensors 1Y and 2Y; 1Y' and 2Y', respectively. The combination quad sensors 121A and B and 121C and D; 121'A and B and 121'C and D perform the functions of sensors 1X and 2X; 1X' and 2X', respectively.

FIG. 11 shows the initial signal processing circuitry for the Y and Y' photosensors. This circuit may be at the Y and Y' photosensors or part of the circuit at the head Y position control 78. The cathodes of photosensors 1Y and 2Y; 1Y' and 2Y' are connected together to a positive voltage source. The anodes of these sensor pairs are connected to the inverting input of conventional operational amplifiers 242. The feedback RC filters 242' on these amplifiers provide low bandwidth on the input signals from the photosensors Y and Y'. The output of the amplifiers 242 is supplied via isolation resistors 243 and respective lines 248, 249, 250 and 251, via summing resistors 244 to a summary node 245 which is connected to an input of summing amplifiers 246. The output input of amplifiers 246 is connected to a reference voltage, e.g., −5.6 volts. The output of the summing amplifiers 246 is connected via isolation resistors and a positive voltage bias to the noninverting inputs of operational amplifiers 242. The purpose of this feedback is to provide for automatic stabilizing of the sensed inputs independent of different light levels that the photosensors Y and Y' might receive from the provided light sources. The magnitude of light from the sources will vary or decrease over a period of time. The feedback amplifiers 246 endeavor to maintain the summing nodes 245 at the same voltage as the reference voltage, e.g., −5.6 volts so that the output voltages of amplifiers 242 are always at the same desired levels regardless of changes in light source intensities over a period of time.

The adjusted outputs on lines 249 and 251 for photosensors 2Y and 2Y' respectively are supplied to summary node 252 via summing resistors 253. The adjusted outputs on lines 248 and 250 for photosensors 1Y and 1Y' respectively are supplied to summing node 254 via summing resistors 255.

The summed voltage value at node 252 is supplied to the noninverting input of linear differential amplifier 256 while the summed voltage value at node 254 is supplied to the inverting input of amplifier 256. The output on line 257 of amplifier 256 is thus representation of any differences in light level conditions determined by sensors 2Y and 2Y' as compared to sensors 1Y and 1Y'. This difference represents a need for left or right correction as the voltage on output line 257 goes above or below the reference voltage of −5.6 volts placed on its noninverting input at node 252. High gain differential comparator 260 receives the output 257 as an input. Comparator 260 is also referenced to the reference voltage of −5.6 volts at its other input. Comparator 260, therefore, makes a sharp determination that the output on line 257 is above or below the reference voltage.

The output on line 257 of linear differential amplifier 256 is filtered by RC filter 258 and is, as previously indicated, an input to high gain differential comparator 260. The other input of comparator 260 is connected to the reference voltage −5.6 volts. Comparator 260 has a small band of sensitivity so that very small changes on line 257 either positive or negative relative to the reference input to comparator 260 will provide a corresponding negative or positive output voltage on line 261. Feedback resistor 260A for comparator provides a hysteresis operating effect for differential comparator 260. The output of differential comparator 260 on line 261 is supplied as an input to the TTL buffer circuit 262. The output of circuit 262 on line 263 will be either a logic high or "1" or a low or "0". These two conditions indicate whether the off balance condition has been detected by the Y photosensors, i.e., a high or "1" output condition indicates that the photosensors are to the left relative to the center of tracking lines 126 and 128 and, therefore, a move to the right is required for head centering while a low or "0" output condition indicates that the photosensors are to the right relative to the center of tracking lines 126 and 128 and, therefore, a move to the left is required for head centering. The inverted output at line 264 is shown but not used in this embodiment.

Having explained the logic meaning of the output on line 263, reference is again made to FIG. 8. There are two different types of alignment conditions and two types of misalignment conditions to consider. The first alignment type is where there is no dimensional offset, i.e., the center-to-center dimensions of the 1Y and 2Y, and 1Y' and 2Y' sensor pairs are identical disecting both tracking lines 126 and 128. This is the case illustrated in FIG. 8. The second alignment type is where there is a dimensional mismatch, i.e., the center-to-center dimensions of the 1Y and 2Y, and 1Y' and 2Y' sensor pairs are not dissecting the tracking lines 126 and 128 but are shifted toward each other or away from each other the same distance relative to the center axis of the tracking lines. Since sensors 1Y and 1Y' and sensors 2Y and 2Y' are summed together, the comparative outputs will be the same in this instance and no Y head position correction will be initiated.

The first misalignment condition is where sensor pairs 1Y and 2Y and 1Y' and 2Y' are respectively shifted in the same direction, either left or right, relative to the center axis of the tracking lines 126 and 128. In the condition where they are both shifted, for example, to the right as viewed in FIG. 8, the output level from the summed sensors 1Y and 1Y' will exceed that of summed sensors 2Y and 2Y' so that the output 263 of circuit 262 will indicate a high or "1" condition. This means that a move to the right for head positioning is required in order that the sensor pairs will be aligned again on the center axis of the tracking lines 126 and 128.

In the condition where they are both shifted to the left as viewed in FIG. 8, the output level from the summed sensors 2Y and 2Y' will exceed that of the summed sensors 1Y and 1Y' so that the output 263 of the circuit 262 will indicate a low or "0" condition. This means that a move to the left for head positioning is required in order that the sensor pairs will be again aligned on the center axis of the tracking lines 126 and 128.

The second misalignment condition is where one sensor pair is shifted either to the left or to the right of the center axis of one of the tracking lines while the other sensor pair is centered on the center axis of the other tracking line. For example, assume that the sensor pair 1Y' and 2Y' in FIG. 8 is centered on tracking line 128 as shown and assume further that the center of sensor pair 1Y and 2Y has shifted to the left so that their center is centered over the left edge of tracking line 126. Since the outputs of sensors 1Y and 1Y' are summed together and the outputs of sensors 2Y and 2Y' are summed together, the output level from the summed sensors 1Y and 1Y' will exceed that of summed sensors 2Y and 2Y' so that the output 263 of circuit 262 will indicate a high or "1" condition. This means that a move to the right for head positioning is required in order that the sensor pairs will be aligned in the manner explained for the second type of alignment condition.

By the same token, assume that the sensor pair 1Y and 2Y in FIG. 8 is centered on tracking line 126 as shown and assume further that the center of sensor pair 1Y' and 2Y' has shifted to the right to be beyond the right edge of the tracking line 128 so that their center is off of the tracking line. The output level from the summed sensors 2Y and 2Y' will exceed that of summed sensors 1Y and 1Y' so that the output 263 of circuit 262 will indicate a low or "0" condition. This means that a move to the left for head positioning is required in order that the sensor pairs will be aligned in the manner explained for the second type of alignment condition.

In both of these examples for the second type of misalignment, the offset of the misaligned sensor pair 1Y and 2Y or 1Y' and 2Y' (whichever the case) could be in the opposite Y direction relative to the center axis of the respective tracking line. In such cases, the corrective head positioning move would be in the opposite direction relative to the directions given in each of the above examples.

FIG. 12 discloses the initial signal processing circuitry for the X and X' photosensors and is part of circuit 77 in FIG. 1. The circuit for sensor pairs 1X and 2X is the same for sensor pairs 1X' and 2X' so that only a single circuit need be shown.

The cathodes of photosensors 1X and 2X or 1X' and 2X' are connected together to a positive voltage source. The anodes of these sensors are connected to the inverting input of the conventional operational amplifiers 268. The feedback RC filters 268' on these amplifiers provide low bandwidth on the input signals from the photosensors X and X'. The output of these amplifiers on respective lines 272 and 273 is supplied via summing resistors 269 to a summing node 270 which is connected to an input of summing amplifier 271. The other input of amplifier 271 is connected to a reference voltage, e.g., −5.6 volts. The output of the summing amplifier 271 is connected via an isolation resistor and a positive voltage supply to the noninverting inputs of operational amplifiers 268. The purpose of this feedback, as mentioned in connection with FIG. 11, is to provide for automatic stabilizing of the sensed inputs independent of different light levels that the photosensors might receive from the provided light sources. The feedback amplifier 271 endeavors to maintain the summing node 270 at the same voltage as the reference voltage, e.g., −5.6 volts, so that the output of the amplifiers 268 are always at the same desired levels regardless of changes in light source intensities over a period of time.

The adjusted outputs on lines 272 and 273 are supplied as inputs to differential comparator 276 via RC filter 274. The output on line 277 of comparator 276 represents any difference in the light level sensed by photosensor pairs 1X or 2X; 1X' or 2X' so that, for example, when 1X sense more light than 2X, the output on line 277 will be positive or when 2X senses more light than 1X, the output on line 277 will be negative. Comparator 276 has a small band of sensitivity so that very small differences between the signals to the inputs of comparator 276 will provide a corresponding negative or positive output voltage on line 277. Feedback resistor 276A for comparator 276 provides a hysteresis operating effect for differential comparator 276. The change on line 277 is supplied as an input to TTL buffer circuit 278. The noninverted output 279 (or 279' in the case of X') of circuit 278 represents either a logic high "1" or low or "0" condition. The inverting output 280 of circuit 278 is not used in this embodiment.

A high to low transition occurring on line 279 indicates a beginning of a cycle 240 between adjacent registration marks 122 or 124, i.e., a balanced maximum light condition has been achieved by sensor pairs as positioned in FIG. 8, while a low to high transition occurring on line 279 indicates a transition occurring in the middle of a cycle 240 wherein a balance minimize light condition has been achieved by sensor pairs as positioned over the center of a registration mark 122 or 124.

Reference is now made to FIG. 13 which is part of the circuit 77 in FIG. 1. This circuit relates to the START PLOT logic under MODE M2 for determining (1) whether the initializing marks 123 have detected and (2) when the first registration mark 127 has been detected to determine the beginning point on the medium for the point of START PLOT to enable writing functions at station 12 (Enable PLOT, enable WRITE, etc.).

Start plot logic 282 comprises four principal components, mark sense logic 284, counting circuitry 286, sense mark test logic 288 and plot start point logic 290. Logic 284 consists of conventional and/or gate and flip flop logic for receipt and interpretation of the three inputs and sequencing the outputs to the counting circuitry 286. The counting circuitry 286 is adapted to count received pulses in a manner that provides a rough but accurate determination that a narrow initializing mark has been observed or that a wide registration mark has been observed. The sense mark test logic 288 is for determining that N "hits" have been made relative the detection of the series of initializing marks, i.e., that N initializing marks 123 have been determined to be in the view of the X sensor and that the circuit should be initialized for the detection of a registration mark 124. The sense mark test logic 288 takes the hit count from circuit section 286, keeps track of the number of hits made determines when N hits have been made. Plot start point logic 290 permits the commencement of other logic functions after the first registration mark 127 has been observed.

The main purpose of mark sense logic 284 is to initially load and reset counter 294, enable the counting of encoder pulses on line 66 upon receipt of X sense mark signal 279 via filter 310 and line 311 and latch the output in register 299 for the final value achieved in counter 294 between X mark sense intervals.

Mark sense logic 284 has four inputs, MODE M2, SLOW FORWARD (FWD), MEDIUM ADVANCE and X SENSE MARK. MODE M2 is a flag indicative that machine control is in the PLOT or MODE M2 of FIG. 3B-1. SLOW FWD is in MODE M3 wherein fast rewind has been completed, the backplate has been lowered and the servo drive motor 23 is then operated to begin the search for tracking indicia for the determination of START PLOT. MEDIUM ADVANCE is in MODE M2 and is the advancement of the medium 16 a sufficient distance to pass the imaged medium over the activated development or toner fountain. MODE M2 and SLOW FWD are enabling signals to logic 186 while MEDIUM ADVANCE is a disenabling signal.

When the signal, MODE M2, to mark sense logic 284 is low, logic 284 is disenabled and, therefore, the start plot logic 282 is disenabled. When signal, MODE M2, goes high, mark sense logic 284 is placed in a readiness state to be in a position to permit the function of looking for tracking indicia 120.

When signal, MODE M2, goes low, apparatus 10 is generally preparing to go into the rewind functions of MODE M3 and mark sense logic 284 prepares circuitry 286 for the next round of counting. In this state a high (LOAD) is placed on logic 284 output line 287 to permit counter 294 to load in the value for a narrow sense mark representative of an initializing mark 123 from the memory switch 296 via gate 298.

Also, when apparatus 10, therefore, goes from MODE M2 to MODE M3, the mark sense logic 284 places conditions in start plot logic 282 in a ready state and upon receipt of the signal SLOW FWD indicative of slow forward movement by drive motor 23 (bottom of FIG. 3C), TRACKING ON on line 291 goes high.

Line 295 is a handshaking and acknowledgement function between mark sense logic 284 and test logic 288. When X sense mark signals from line 279 are being received via line 311 in mark sense logic 284, marks sense logic 284 will provide an indication to sense mark test logic 288 to look for the appropriate indication that a high has been made and also to initialize for counting N initialize marks.

Counting circuitry 286 comprises a counter that is able to determine roughly when a narrow mark interval or a wide mark interval has been observed. This function need not be highly accurate, i.e., it can be within 10 percent of the actual interval and confirm that the appropriate mark interval has been observed.

Memory switch 296 contains an 8 bit count representative of a narrow mark interval. This count value is present on gates 298, which function like a series of AND gates. The count value is placed into counter 294 upon the LOAD received on line 287. This LOAD function is enabled when PLOT input is high.

Output lines 279 and 279' from FIG. 12 are supplied as inputs to mark sense sync filter 310. The funtion of filter is to synchronize these signals with the fast $3\mu$ clock of the circuitry as well as determine that the signals received are in fact sense mark intervals. This is accomplished by determining that the mark sense intervals persist for at least N number of clock pulses, e.g., 3 clock pulses. The X sense mark output of sync filter 310 appears on line 311 which is an input to both mark sense logic 284 and plot start point logic 290. Upon receipt of this input, logic 284 places this input on output 292, COUNTER ENABLE (CTR EN) to AND gate 293. This output represents the cycle of one mark sense interval so that as AND gate 293 is enabled by a negative going mark interval transition, encoder clock pulses on line 66 will be fed into counter 294 for counting. The count value in counter 294 is decremented by the enabled encoder pulses for each mark sense interval and value remaining per interval is latched into holding register 299 via line 289. When the count value is decremented somewhere close to the value of a series of encoder pulses between mark sense intervals, either above or below that value, the count held in register 299 will be at a point close to either all binary 0's or 1's indicative that the decremented count is on the verge of being a match with the count value in memory switch 296. Since only a rough approximation is needed as to mark sense interval being detected, only the 5 most significant bits are examined and held in register 300. When the 5 most significant bits are all binary 1's or 0's, a "hit" has been scored and the indication of a "hit" is supplied as an input on line 301 to sense mark test logic 288.

Note that if a "false" sense mark of different mark interval, e.g., a scratch or smudge on the medium surface 17, were received at filter 310 and past the verification test for N clock pulses, the counter 294 would be enabled via mark sense logic 284. However, counting circuit 286 would with high probability never score a hit since the mark sense interval would not roughly coincide with that for either a narrow or wide tracking mark.

Further, to insure that a narrow initializing mark as, in fact, been sensed by counting circuitry 288, several sense marks are verified to have been observed before sense mark test logic 288 makes a final determination that a series of initializing marks have, in fact, been observed. This determination is accomplished with the aid of two bit counter 303.

The binary count of two is loaded into counter 303 from memory switch 305 at the start of this verification process. The loading of counter 303 is accomplished by an enablement on line 304 (LOAD). The initial enablement or LOAD of counter 303 is accomplished with handshaking from mark sense logic 284 wherein upon the receipt of what appears to an input from 311 of a mark sense interval, a signal on line 295 initializes sense mark test logic 288 which includes the loading of counter 303.

When logic 288 receives a "hit" on line 301, counter 303 will be decremented via line 306 by a count of one. Three "hits" in a row on line 301 will cause an overfill in counter 303 with the spill over placed on output borrow line 307 of counter 303. Thus, three hits means that three good representations of initializing marks 123 has occurred and that the beginning of a plot is, indeed, intended and that observation and verification of wider registration mark 122 is in order.

If three sense mark intervals do not occur in a row, sense mark test logic 288 will enable 2 bit counter 303 via line 304 to reload its content with the count of two from memory switch 305. If further mark sense intervals are not received on line 311 by mark sense logic 284, logic 284 will place a signal on line 295 to cause sense mark test logic 288 to reinitialize for further narrow mark verification. This reinitialization includes the reloading of counter 303.

Once three hits in a row have been determined, the indication of which appears on the borrow line 307 to logic 288, logic 288 will then provide a signal on output line 302 to gates 298 to connect the wide count value in memory switch 297 to appear on the gates 298. This value is an 8 bit count representative of a wide mark interval, i.e., the mark interval of a registration mark 122 or 124.

Memory selects 296 and 297, having selected values respectively for narrow and wide mark sense intervals, can be preselected to any desired number value.

Additional narrow width sense mark intervals will be continually received at this time, as there are usually more than three initializing marks 123 as illustrated in FIG. 7. Since counter 294 will is now be loaded with the wider sense mark value, a "hit" would not occur in counting circuitry 286 due to the large value difference in count comparison thereby making it impossible to reach an all binary 1's or 0's value in the five most significant bits in register 300.

When a wider registration mark is observed and the approximate value of its mark interval is achieved when the five most significant bits in register indicate either all binary 0's or 1's, an output on line 301 will indicate that a "hit" has been made. Logic 288, having previously set output 302, will interpret the receipt of this "hit" as the first wide registration mark 127 from which a determination can be made as to the precise point for START PLOT at 223 (see FIG. 7). At this time, sense mark test logic 288 enables its output line 308 which is indicative of wide sense mark inteval detection. This embodiment will enable plot start point logic 290 to permit the initialization and functioning of other circuitry shown in FIGS. 15 and 16 to utilize the continually received sense mark data for determining fine X, Y and $\theta$ adjustment functions to be made. The output on line 308 represents a tracking acquisition signal (TRK ACQ) input to the circuitry in FIGS. 14 and 15 which will be discussed later.

The enablement of logic 290 causes three principle functions to occur. First, logic 290 includes a counter and memory count select similar to counter 303 and memory switch 305 except that the logic 290 memory switch is set to the number value "R", which is representative of the number of wide regisration marks to the the START PLOT point 233. When plot start point logic 290 has received via line 308 from sense test logic 288 a sufficient number of mark sense intervals equal to R registration mark sense intervals, logic 290 will enable output line 318, START PLOT, to circuitry 56 in preparation for enablement of writing at recording station 12. Also, it will be recalled in connection with the discussion in FIG. 3C that system control will advance medium 16 to point 233 at which time drive motor 23 will be stopped (END SLOW FORWARD). Secondly, plot start point logic 290 also loads the X and X' sense mark inputs on lines 311 and 312, respectively, onto lines 315 and 316. These outputs, termed X MARK SIGNAL LOAD and X' MARK SIGNAL LOAD, are supplied as inputs to the circuitry shown in FIG. 16, which will be discussed later.

Reference is now made to FIG. 14 which shows in more detail the sensor interface and stepper control 168 of FIG. 5.

The sensor interface comprises control logic 320 that is conventional circuitry designed to interpret its inputs in a conventional manner to provide velocity via line 330 and direction indication via line 331 to conventional stepper motor drive circuitry 322. Logic 320 has two manual inputs. There are the manual command left and right inputs 324 and 325 which permit manual operation of stepper motor 205 whereby an operator is permitted to manually initialize the lateral translation and position of supply roll 18. Input 327 is the general logic clock input. Input 328 is a disenabling input provided by a mechanical limit switch on apparatus 10 to prevent any operation of the supply roll stepper motor 205 when the lid of apparatus 10 (not shown) is in a lifted or raised position.

Input 308 is TRK ACQ from start plot logic 282 of FIG. 13. This is an enablement input to control logic 320 to commence the sensing functions and relative to medium position and lateral adjustment of supply roll 18 as explained in connection with FIG. 5.

The inputs 221 and 222 from the limit sensor device 216 mounted on frame 140 are also inputs to control logic 320.

As mentioned relative to FIG. 6, the optical edge sensor 225 produces a signal that is proportional to the amount of coverage of medium 16 over the sensor detection surface as compared to the amount of coverage off of the medium edge and exposed to light source 224. The proper edge position for medium 16 can therefore be proportional to a predetermined voltage value on line 167 which can be set to the voltage value for $V_{REF}$. The set value for $V_{REF}$ is compared with the voltage appearing on line 167 in comparator 332 which also includes comparator amplifier and Schmitt like trigger. Comparator 332 functions in a similar manner as comparator 260 and circuit 262 in FIG. 11 by providing hysteresis operating effect which is representative of a "deadband" of operation for stepper motor 205 sot hat the motor will not be placed in a "chatter mode", i.e., alternately stepped in one direction and then the other in a continuous manner. The output 326 of comparator 332, therefore, is a logic value of either are binary "0" or "1" indicative of the magnitude of the difference between sensor input 167 and $V_{REF}$ as well as whether the value for input 167 was higher or lower than the representative value for $V_{REF}$. These values are interpreted by control logic 320 in a conventional manner into drive pulses for motor drive circuitry 322, the value of which is proportional to the magnitude of offset from $V_{REF}$. Also, the amount of sensor coverage indicates which direction the motor drive circuitry 322 should drive motor 205. Logic 320 is conventional configured logic used for such optical sensor applications to determine direction and magnitude and comprises AND/OR gate logic and two flip flops to hold the state of various input signals and interpret the signal sequence. The stepper motor drive circuitry 322 is conventional and comprises a high current driver having a four phase output to operate the unipolar four phase stepper motor 205. The four phase outout is necessary for direction control of motor 205.

As previously explained relative to description of FIG. 3, the limit sensor 216 provides for maximum limits of operation on motor 205 and provides a starting or initialized position for lateral roll translation above that achievable through line-of-site positions of the medium translation via inputs 234 and 235. How this initialization is achieved for the initialization of medium guide servo control 168 is the same as detailed in FIG. 15 relative to the operation of state sequencer 342 and initialization control logic 346, although this Figure is directed to the implementations for the Y and θ position controls 78 and 80.

Figure 15A:
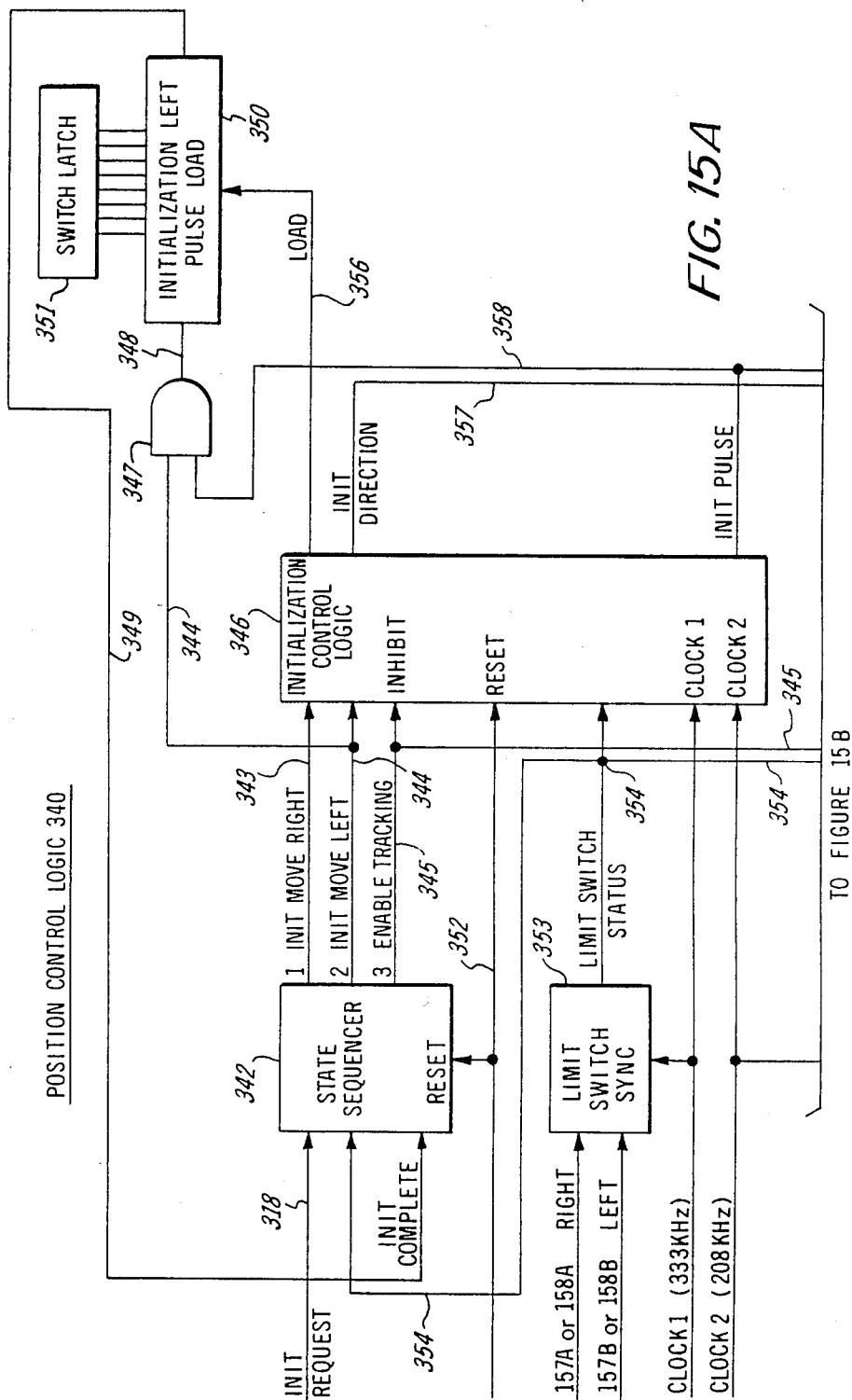
FIGS. 15A and 15B comprise a circuit diagram for either the head Y position control or the head θ position control in FIG. 1 to respectively provide lateral or rotational translation of the recording head.
Figure 15B:
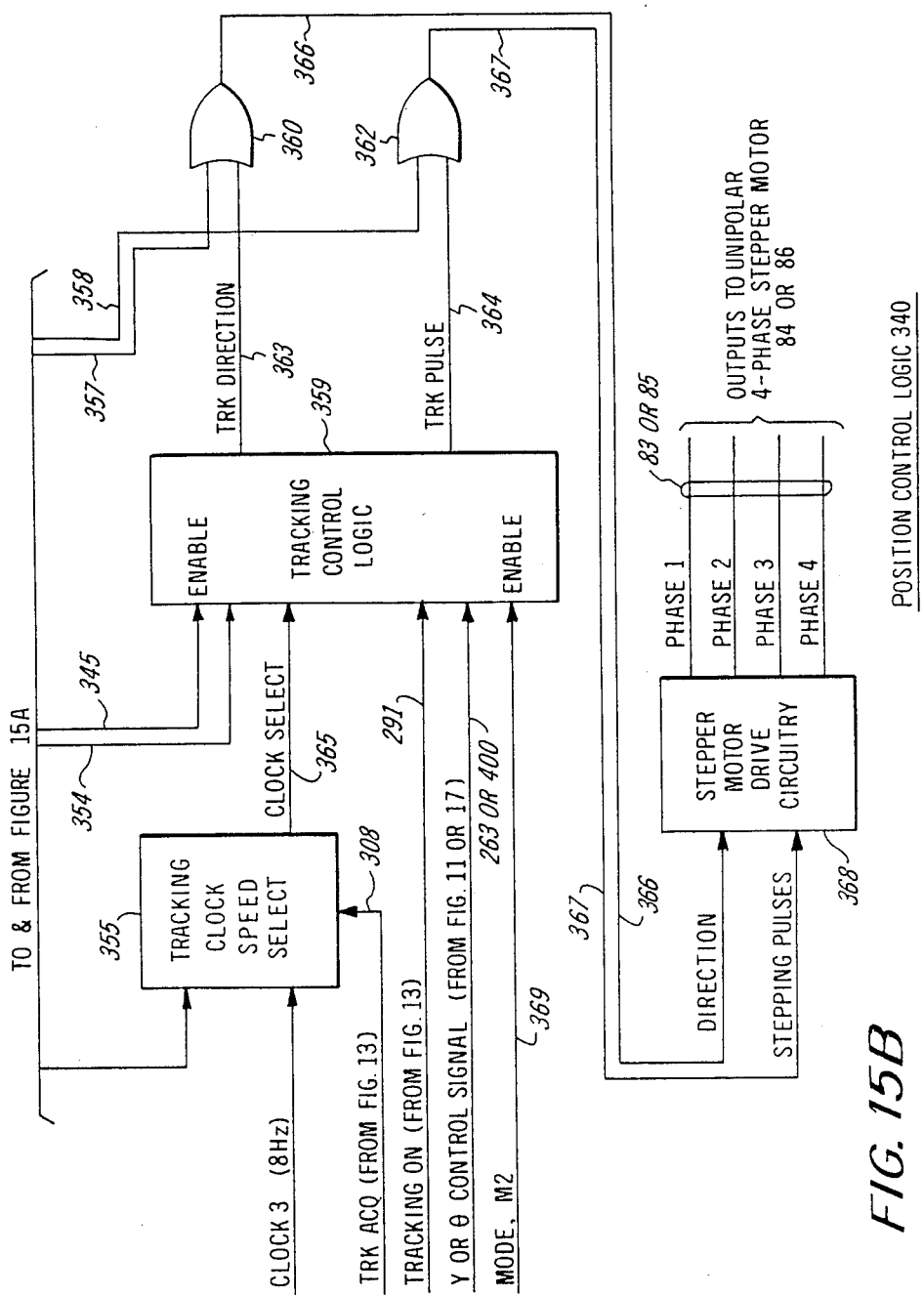

FIG. 15 is logic block diagram representative of the position control logic circuit 340 for use either with head Y position control 78 or the head θ position control 80. The first function to occur is that a command for initialization request is received by the logic circuit 340 to initalize the translation of the head 48 or the θ translation of the frame 129 into a central or neutral position. The initialization INIT REQUEST is a machine control signal that occurs just before MODE M1 as shown in FIG. 3A and also at the end of MODE M2 as shown in FIG. 3B-2. The INIT REQUEST is received by the state sequencer 342 in circuit 340. Sequencer 342 is a control that has three output states, INIT MOVE RIGHT, INIT MOVE LEFT and ENABLE TRACKING (ENB TRK). These states are respectively outputs 343, 344 and 345 of sequencer 342. These oututs are also inputs to initialization control logic 346. Output 344 is also an input to an initialization left pulse counter 350 via AND gate 347 and input line 348 to counter 350. Counter 350 is connected to a memory switch 351 which contains a predetermined number value for input to counter 350. The count value represents the initiaized position desired for the selected head translation.

Sequencer output line 345, ENB TRK, is also an enabling input to tracking control logic 359.

State sequencer 342 and initialization control logic 346 are reset via line 352. Reset places sequencer back into its first state position for activation upon receipt of INIT REQUEST. Reset in logic 346 reloads counter 350 via LOAD line 356.

Another input to the initialization control logic 346 include limit switch status on line 354. Line 354 is also an input to state sequencer 342 and tracking control logic 359.

Three different clocks are involved in the operation of position control circuitry 340. There is the main system clock 333 KHz or clock 1, a slower clock, clock 2 (208 Hz) and much slower clock, clock 3 (8 Hz). Clocks 1 and 2 are inputs to initialization control logic 346. Clock 1 is also an input to limit switch sync 353. Clock 2 is also an input to tracking clock speed select circuit 355. Slow clock 3 is also an input to circuit 355.

The purpose of limit switch sync circuit 353 is to receive as an input an indication that a maximum limit has been met at an appropriate limit switch sensor device 150 or 152, whichever the case may be. The limit switch inputs 157A or 158A, or 157B or 158B, as the case may be, are provided as inputs to limit switch sync circuit 353. Circuit 353 merely syncs an incoming limit switch signal with the main system clock 1 to be in synchronization with the clocking of logic circuit 346. The indication of limit switch status is set on line 354 to initialization logic circuit 346 tracking control logic 359 and to state sequencer 342.

Initialization control logic circuit 346 has three outputs. The first output is a command signal, LOAD, on line 356 to cause counter 350 to load the number value from memory switch 351. The second output is an initializing INIT DIRECTION command on line 357 to an input of OR gate 360. The third output is an initializing INIT PULSES command on line 358 to an input of OR gate 362. The output on line 358 is also the other input of AND gate 347.

The outputs 363 and 364, TRK DIRECTION and TRK PULSES, of the tracking control logic circuit 359 are the other inputs to OR gates 360 and 362, respectively.

Tracking clock speed select circuit 355 also has, as an input, line 308 (TRK ACQ) from FIG. 13. As will be further explained, this input provides an indication as to when either the clock 2 or clock 3 rate should be selected as an output on CLOCK SELECT line 365 to tracking control logic circuit 359.

The other inputs to logic circuit 359 are line 291 (TRACKING ON) from FIG. 13, line 263 (Y or θ TRACKING DIRECTION) from FIG. 11 and MODE M2, an enabling signal from machine control indicative that apparatus 10 is operating in MODE M2.

During initialization of the head position drives, initialization control logic circuit 346 provides the INIT DIRECTION and INIT PULSES to the high current driver circuity 368 via lines 366 and 367 respectively from the outputs of OR gates 360 and 362. The output of circuitry 368 is, therefore, the four phase lines that are represented as line 83 or 85 in FIG. 1, as the case may be, to the stepper servo drive motors 84 and 86.

After initialization is complete, the function of initialization control logic circuit 346 terminates and the function of tracking control logic becomes operational based upon the sensing conditions of the Y and Y' tracking of medium tracking lines 126 and 128, for example, to provide tracking direction, TRK DIRECTION, on lines 363 and 366 and tracking pulses, TRK PULSE, on lines 364 and 367 to drive circuitry 368 when apparatus 10 is in MODE M2 operation.

An explanation will now be given relative to the overall operation of the position control logic circuit 340.

Reset via line 352 has been accomplished. Reset causes initialization logic circuit to cause counter 350 to load in the number value contained in switch 351. Switch 351 may be selected to have any number that is representative of a close approximation as where the sensors X and Y, X' and Y' will be fairly aligned to the tracking indicia 120 as indicated by the dotted lines 119 in FIG. 2. Reset at sequencer 342 initializes its sequence so that the first operative output will be INIT MOVE RIGHT. Upon the receipt of an INIT REQUEST command at state sequencer 342, the sequencer enables output, INIT MOVE RIGHT on line 343. This command is to move the head from its present Y or $\theta$ (rotated) position clear to its maximum right position allowable by the respective limit switch devices 150 or 152 associated with head frames 68 and 129. Upon frontal viewing of FIG. 2, this means in the case of head Y position control to drive the head frame 68 toward the bottom of the figure until flag 154 intersects the light path of sensor/source 153. In the case of head $\theta$ position control this means to rotate eccentric 141 until the light path of sensor/source 151 is intersected by flag 156. Therefore, upon INIT MOVE RIGHT going high, logic circuit 346 provides a "right" INIT DIRECTION command on lines 357 and 366 to motor drive circuitry 368. Also, logic circuitry provides a continuous train of stepper pulses, INIT PULSES, on lines 358 and 367 to motor drive circuitry 368. Clock 2 clock rate is employed to the stepper INIT PULSES on line 358 to swiftly carry out the translation head movement to a maximum right position.

Once the right position limit is reached, a limit switch signal via line 157A or 158A, as the case may be, is received at limit switch sync circuit 353 which provides an indication to initialization logic circuit 346 via line 354 that the maximum limit has been achieved and the output on line 358 of INIT pulses at the clock 2 rate is terminated.

The receipt of this limit switch status at sequencer 342 provides a high on line 344, INIT MOVE LEFT. This output causes logic circuit 346 to issue INIT PULSES on line 358 at the clock 2 fast rate while providing an INIT DIRECTION indication on line 357 of move "left". The high on output 344 enables AND gate 347 and the pulses provided on line 358 are also supplied to counter 350. Counter 350 is decremented until the count equals zero at which time a signal high or INIT COMPLETE, is provided on output line 349 from counter 350 to state sequencer 342. This signal causes state sequencer 342 to place a high on output line 345 or ENB TRK. The effect of this high is to disenable initialization control logic circuit 346 and provide an enable to tracking control logic circuit 359, indicating that initialization of head positioning to a preselected position (Y and/or $\theta$) has been accomplished and regular tracking functions via photosensors X and Y can be performed during MODE M2 operation.

When MODE M2 has commenced, another enablement is provided to tracking control logic circuit 359 on line 369. The last enablement input for circuit 394 is TRACKING ON on line 291 from the start plot logic circuit 282 in FIG. 13. When this input is high, circuit 394 is enabled to receive Y tracking logic signals from the output of Y sensor interface circuit of FIG. 11 on line 263. These signals, as previously indicated, are either a logic "0" or "1" and indicative of a one step movement respectively either to the left or right dependent on the Y, Y' sensor relationship to tracking lines 126 and 128 as explained in connection with FIGS. 8–10.

It will be recalled that when TRACKING ON is enabled, the searching for the detection of narrow initializing marks 123 prior to the detection of a first wide registration mark 127. During this period of time, the output on line 308 or TRK ACQ is at a low. This causes tracking clock speed select circuit to select the faster clock rate, clock 2, for line 365 to place tracking control logic circuit 359 in a high speed Y tracking mode. Thus, during start plot determination, head Y and/or $\theta$ position control is actuated to permit respectively swift Y and $\theta$ corrections to be made to the head frame 68. As Y tracking logic signals are received at input line 263 to logic circuit 359, logic circuit 359 will issue a left or right direction command, TRK DIRECTION, on line 363 and a tracking pulse command, TRK PULSE, on line 364. The feeding of the tracking pulses will be at the clock 2 rate of the tracking pulses to the appropriate stepper motor 84 or 86. The incremental steps provided by the fine Y and $\theta$ adjustment stepper motors 84 and 86 may be, for example, one tenth of a mil.

Once the start plot logic circuit 282 of FIG. 13 has achieved a wide registration mark "hit" and enables output on line 308, TRK ACQ, will go high. This input high to tracking clock speed select circuit 352 will place the slow clock rate of clock 3 on its output line 365 to tracking control logic circuit 359 and place the tracking function into a low speed tracking mode.

From the foregoing explanation, it can be seen that the position control logic circuit 340 sequentially provides (1) initial head position setting, (2) high speed Y line tracking for head centering or rotational positioning prior to actual recording or writing of data, and (3) low speed tracking for head centering or rotational positioning during actual plotting.

Figure 16:
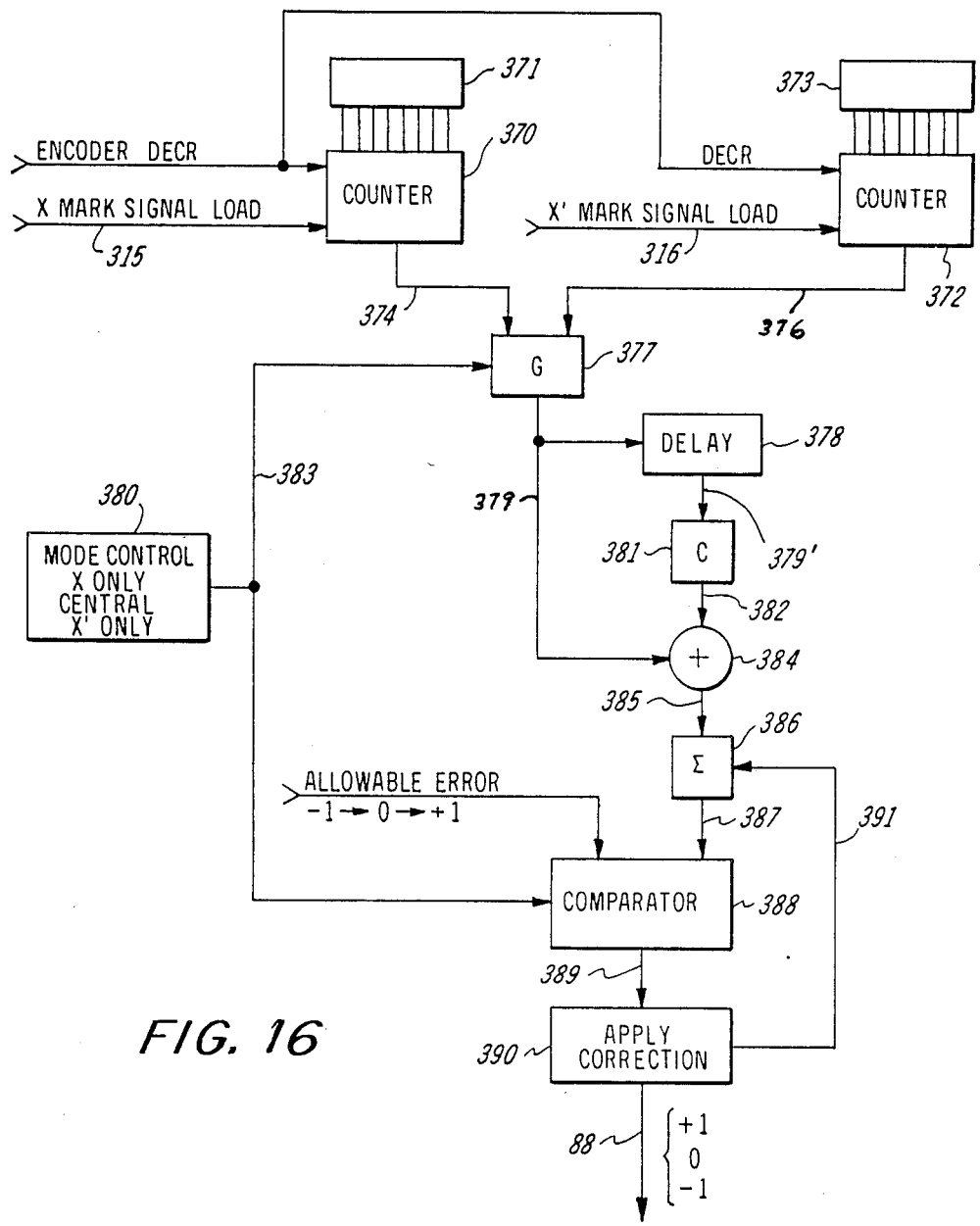
FIG. 16 is a circuit diagram for the write timing adjustment in FIG. 1 to provide correction to the timing logic for energization of the electrode means at the recording head.

Reference is now made to FIG. 16 which discloses detail relating to write timing correction 82 in FIG. 1. The X and X' MARK SIGNAL LOAD respectively on lines 315 and 316 from start plot logic circuit 282 are inputs to the respective counters 370 and 372. Another input to each of the counters received at 370 and 372 is from encoder 62 via line 66 providing encoder pulses developed by the encoder working off the moving medium 16. The encoder pulses decrement the respective counters 370 and 372. Counters 370 and 372 are loaded with a count value equal to M encoder pulses from their respective memory switches 371 and 373. As each X or X' MARK SIGNAL LOAD, representative of the end or beginning of a mark sense interval, is inputted to the respective counters 370 and 372 with the preloaded M value, the encoder pulses on line 66 decrement the counters until the next mark interval is received on their respective input lines 315 and 316. Any value remaining at the time of the next mark sense interval is placed on respective output lines 374 and 376.

As the X or X' sensor "see" the moving registration marks 122 and 124, a series of mark sense transitions are created via the circuit shown in FIG. 12. This is because each of these sensors include a sensor pair and a balance of either light or dark produced from the sensor pair will create a signal transition so that the output signals, X and X' MARK SIGNAL LOAD will have a cycle 240 (FIG. 8) that begins and ends between the spaced registration marks. The signal will have negative transitions in the middle of white spacings between marks and positive transitions in the middle of the dark marks. Thus, as the sensor pairs 1X and 2X, 1X' and 2X' see a balance in maximum or minimum illumination, the signal switches polarity. The series of pulses will, of course, depend upon the velocity of the recording medium 16. As an example, the typical mark sense cycle or interval may be 0.16 inch and, therefore, 160 milliseconds period at a medium velocity 1 inch per sec or a 1.6 second period at a medium velocity at 0.1 inch per sec. The encoder on the other hand is capable of producing 2,000 pulses per revolution.

The counters 370 and 372 count the encoder pulses between negative transitions of mark sense intervals. It is a predetermined fact that there should be M encoder pulses per mark sense interval. Once the encoder pulses have been counted between mark sense intervals, the value M is subtracted from the count. Any difference, i.e., any encoder pulses remaining under the value of M or over the value of M represents error. This error represents the value for shrinkage or expansion of medium 16 since the time of placement of the tracking indicia 120. This error may be, for example, +1 or −1 or a larger value. This error is representative of X dimensional changes from center to center of the registration marks 122 or 124. By injecting a correction pulses, such as, +1 or −1, into the clocking scheme in the write driver logic and timing circuitry 56 as the recording head 48 is laying down scan lines of data, the data presented can be either delayed, unchanged or speeded up so that correction to the placement of the lines of data on the medium 16 based upon changes in the X dimensional direction can be accomplished on-the-fly. What is actually occurring is that the lines of data are either brought closer together or staged further apart by very minute increments, e.g., one fourteenth of a line which is equal to one encoder clock pulse. This is roughly equal to one third mil. Thus, if the electrodes 50 are able to create 5–7 mil dots on medium 16, the employment of a one third mil correction increments provides for fine X adjustment based upon medium shrinkage or expansion.

It is preferred that single increment corrections of +1 or −1, which are equal to one encoder clock pulse per head cycle firing sequence (one complete scan line of data in field 15 in the Y direction), should be made at a time vis-a-vis several correction pulses, as this provides some damping and prevents over correction.

Experience has shown that typical changes in medium shrinkage and expansion may be about 1 mil per foot of recording medium length so that the amount of correction needed is very small.

The unfortunate fact about the LEFT ERROR and RIGHT ERROR output on the output lines 374 and 376 from counters 370 and 372 is that the sample values, representative of medium error, are not free from signal noise. As an actual example, the value used for M happens to be 448 pulses. Thus, where there is no dimensional change in the medium, there should be 448 encoder pulses between negative mark sense intervals. Experience has shown that out of 448 pulses, a difference of ±8 encoder pulses may represent signal noise and the expected error may be only ±0.02 of that value. This is a typical signal to noise value. The noise is caused by several factors. First, the writing process for producing the registration marks 122 and 124 on the medium 16 provides inherent flairs and drop outs so that some of the marks may appear to be ragged or fuzzy to the X and X' sensors. Secondly, the toner may have varying degree of intensity and concentration and vary in the extent of coverage on the medium by minute amounts during the development of the registration marks. Third, the X and X' sensors operate with some noise. The remaining portion of the circuit diagram in FIG. 16 is devoted to eliminating this error from the mark sense interval error values or samples on lines 374 and 376.

As previously mentioned, the mark sense intervals are known to comprise M encoder pulses in the time frame intervals between the mark sense transitions derived from the optical sensor pairs 1X and 2X; 1X' and 2X'. If the medium has stretched, there will be one or more encoder pulses above the value M between mark sense intervals. Conversely, if the medium has shrunk, there will be one or more encoder pulses below the value M between mark sense intervals. These pulses above and below the value M may be termed samples. As indicated above, experience has shown that a major portion of the sample values is signal noises. The effect of this noise may be significantly removed by effectively averaging several samples together and making error corrections according to N samples comprising a sample group. This is mathematically accomplished by taking a running average over N samples wherein a current sample is added to the sample group and the oldest sample in the sample group is dropped out. One manner of accomplishing this through logic circuitry is by taking each current sample group and effectively dividing by N, i.e., the number of samples in the group and then carry out a summation of these values in a summation circuit. The value in the summation circuit will be the total value of error for the mark sense intervals over a series of N samples.

Another manner of mathematically accomplishing this through logic circuitry is illustrated in FIG. 16. As shown in FIG. 16, the samples on lines 374 and 376 are serially fed to delay 378 via gate 377 and line 379. Line 379 is also directly connected to summation circuit 384. Gate 377 is controlled by mode control 380 via line 383 which can permit the gate 377 to enable X ONLY samples, or X' ONLY samples of a combination of both X and X' samples (CENTRAL) to delay 378. Mode control 380 also provides the advantage of being able to select samples developed from one side of medium 16 when a failure exists in the detection circuits at the other side of the medium, e.g., light source failure depended upon by the X sensors. The utility of utilizing both X and X' sources for samples is taking into account more information relative to X dimensional changes although, the use of one such sample source has been found sufficiently adequate.

Delay 378 comprises a shift register which can contain N samples at a time. In this manner, the samples are delayed in time compared to the same samples on line 379. Before each cycle of operation, a current sample is loaded into delay 378 from line 379 and the last one is loaded out on line 379. The values on line 379 are then converted to their complement value at complement 381 and provided on line 382 as the second output to summation circuit 384. The value in circuit 384 represents the combined average running mean for the samples.

The bigger the sample group N, the more noise present in the samples may be effectively averaged out. However, sample groups too large will take longer to process the sample group and corrective action will be unreasonably delayed. The varying error over long medium distances for which correction is needed may be not applied in proximity to the affected medium section. If both the amount and the "polarity" of the error is changing, tracking medium dimensional error with large sample groups of errors is not possible because the detected error and applied correction will come too late, as the portion of the medium affected has since passed the position of the writing head 48. In this connection, it should be noted that the X, X', Y and Y' sensors should be fairly close to the head 48. However, they may be positioned on either side of the recording station 12 as the need for correction will not vary significantly over medium distances.

In any regard, somewhere between a small and large sample group is a range of optimized sample averaging. In the system disclosed in FIG. 16, N=16 was chosen. However, N=8 or 32 could also have been easily employed.

The combined average running mean in circuit 384 is then supplied on line 388 to a summation circuit 386. In circuit 386, the running mean produced in each cycle of operation of the delay 378 is added to a running total value. This total value is called the sum of the running mean.

The run output of circuit 386 is supplied on line 387 to comparator 388 wherein the sum of the running mean is compared with an allowable reference error. The allowable reference error represents an allowable error band, e.g., from $-1 \rightarrow 0 \rightarrow +1$. If the summed value from summing circuit 386 becomes equal to or greater than $\pm 1$, a correction command via line 389 is given at circuit 390. The action taken is that a correction pulse is issued to the timing circuitry 56 via line 88 in FIG. 1. At the same time, the total sum value in the summation circuit 386 is decremented by the same correction amount, i.e., the sum of the running mean is decremented each cycle by the value from correction circuit 390 via line 391.

Line 383 from mode control 380 is also connected to comparator 388. If mode control 380 is set for X ONLY mode or X' ONLY mode, then the comparison value representative of the allowable reference error will be to set to N. If mode control 380 is set for CENTRAL mode, then the comparison value representative of the allowable reference error will be set to 2N since there are twice the samples involved in error correction.

The correction pulses are received by circuitry 56 on line 88. What the correction pulses do is to either advance or delay data pulses applied to the backup electrodes 54 at the recording station 12. In general, encoder 62 operating on the recording medium provides information as to how far the medium has moved. Incremental movement of the encoder will fire off, in sequence, the backup electrodes 54. If the recording medium has expanded so that the image being created is running behind, the backup electrodes are sequentially fired one or more times between encoder pulses (one sequence firing for each positive correction pulse on line 88). If the recording medium has shrunk so that image placement has become cramped or too closely spaced line data, then one or more encoder pulses will be ignored (one less sequence firing for each negative correction pulse on line 88). The manner of firing of the writing electrodes 52 and the sequence firing of the backup electrodes is known in the art and is set forth in 8000-F Series Electrographic Film Plotter Operating Manual, Volumes 1 and 2, supra.

In the typical design of writing head 48, activation of each writing electrode 50 will produce 5–7 mil dot. One correction pulse on line 88 represents a one third mil correction. A typical correction needed is one firing for an advance or delay of 0.3 mils over every 20 registration mark intervals. While one cannot visually discern this incremental correction in terms of developed scan lines of date as being closer or further apart, the improvement accomplished in resolution is discernable when this fine X adjustment is utilized during the formation of successive color component images superimposed on one another on the recording medium.

Figure 17:
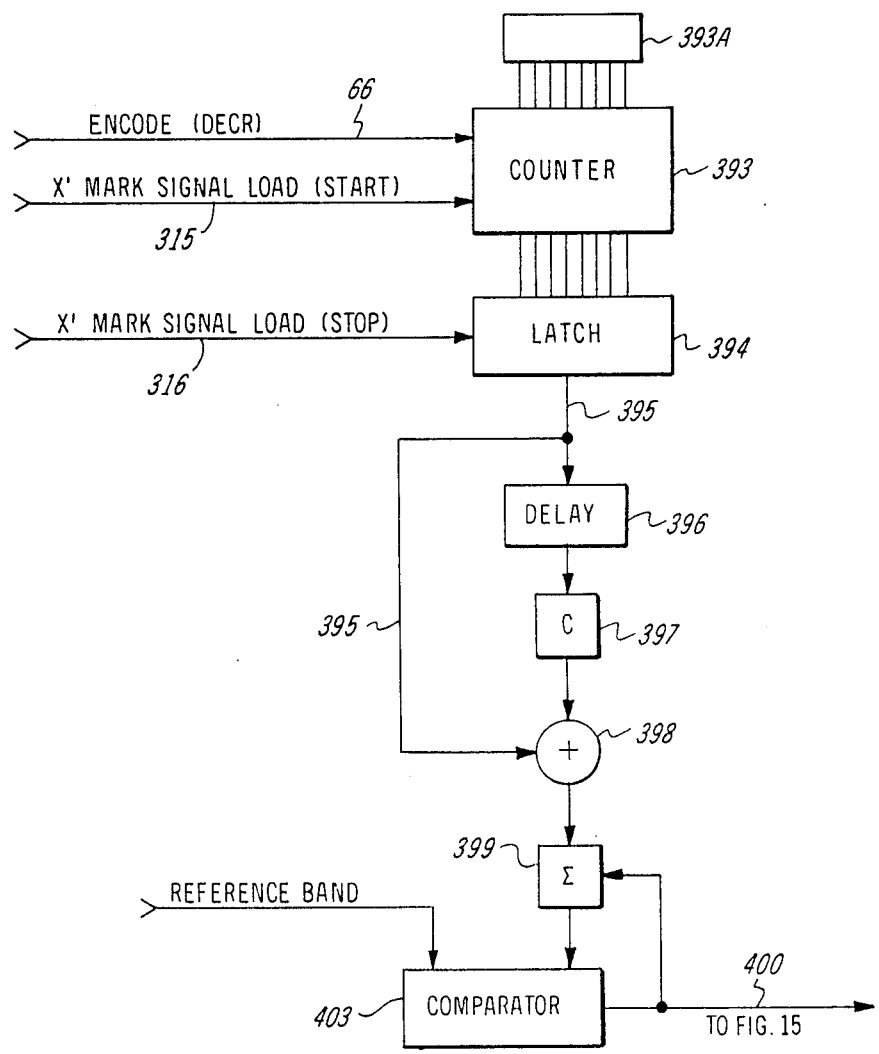
FIG. 17 is a circuit diagram for the head θ position control in FIG. 1.

In FIG. 17, the circuit implementation for error processed head $\theta$ control signals on line 400 to the position control logic circuit 340 in FIG. 15 is shown. The circuit implementation of FIG. 17 is provided as part of the Head $\theta$ position control 80 in FIG. 1. The same kind of noise reduction can be applied to the X and X' MARK SIGNAL LOAD signals on line 315 and 316 for the $\theta$ position control before they are supplied to the position control logic circuit 340 in FIG. 15.

In FIG. 17, the X MARK SIGNAL LOAD on line 315 is supplied as a start signal for counter 393. Counter 393 is loaded with a count value equal to M encoder pulses from memory switch 393A. As each X MARK SIGNAL LOAD is inputted to counter 393, preloaded with the M value, the encoder pulses on line 66 decrement the counter. As soon as a signal, X' MARK SIGNAL LOAD, is received on line 316, the value in counter 393 is latched into register 394. This value then represents the phase difference between an incoming X mark sense interval and an incoming X' mark sense interval and represents an output line 395 the difference in distantial amounts on one side of the recording medium as compared to the other and is indicative that the medium is slightly skewed in its path through apparatus 10. Correction can be made for this medium skew by slightly rotating head 48 as previously explained relative to head $\theta$ position control 80 and head $\theta$ servo drive 86.

These error values are fed into delay 396 which is the same as delay 378 in FIG. 16. A running average over N samples is examined per cycle wherein a current error sample is added to the sample group via line 395 into delay 396 and the oldest sample in the sample group is provided to the complement circuit 397. The delay complement signal and the original error signal are added by adder 398. The value here represents the combined average $\theta$ running mean. These values are added to a total value by summation circuit 399 which provides the sum of the $\theta$ running mean. This total summed value is compared to an allowable reference error, e.g., from $+1$ to $+1$, in comparator 403 to produce a logic signal on line 400 wherein each pulse is representative of a step value for servo motor 86 to rotate head 48 in one direction or another based upon a count value as measured in encoder pulses and determinative of whether X mark sense intervals are exceeding or diminishing relative to X' sense mark intervals.

In some writing processes, a complete scan line of data produced on a recording medium is done during which there is no movement of the medium. In other writing processes, the medium is always under a condition of movement during sequence firing of the backup electrodes. As a result, scan lines of data is sequentially laid down at a slight angle relative to the Y direction. This is the case of the previously mentioned 8000F series electrographic plotter wherein as the backup electrodes are sequentially fired, the medium has moved approximately 5 mils, for example, so that one end of a single scan line trails its beginning by this 5 mil amount. Such differences are not readily determinable by eye inspection but would have to be taken into account in the counter 372 of FIG. 16 and counter 393 in FIG. 17. In comparing registration mark sense intervals of registration marks 122 versus registration marks 124, the M value for encoder pulses will have to be lower for the X' mark sense interval. For example, if the positional difference across the medium between X and X' registration marks 122 and 124 is 5 mils, the M value for the X' counter function would be 14 less encoder pulses than M value for the X counter function. This is because if the values for M is 448 for an X mark sense interval and 5 mils is equal to 14 encoder clock pulses, then the M value for X' mark sense intervals will be 448 minus 14 or 434. In this case, the count in memory switch 393A would be set to M=434.

FIG. 18 details an implementation for the tension servo control 164 of FIG. 1. The purpose of dancer roll 160 is remove any loop that is produce in the medium during its movement through apparatus 10. Better control is maintained on medium movement, particularly at higher velocities, keeping constant tension on the medium and, also, provide for lower inertia. If movement of the medium movement is primarily always at a slow or gradually changing velocity, the need for the dancer roll may be nonexistent.

Dancer roll 160 is pivotally supported for vertical movement on an arm 401 between two support rolls 402 and 404. Arm 401 is biased onto the surface of the medium 16 by a preselected amount of force by compression spring 406. This force is indicated by arrow 161. Arm 401 has its pivot point connected to a movable commutator 408 of a reostat 410. Reostat 410 has linear resistance connected across a power source 412. As the tension and, therefore, the vertical elevation of dancer roll 160 varies vertically between rolls 402 and 404, commutator 408 will also move providing an analog output proportional to the movement of arm 401. This output on line 163 is supplied to a comparator 414 which may comprise the inverting input of a differential amplifier. The signal on line 412 is compared with a positive reference value, $V_R$ which is supplied to the noninverting input of comparator 414 via switch 416. The value, $V_R$, represents the value of the preselected tension desired on the surface of medium 16 by dancer roll 160. The compared output provided on line 418 is, therefore, representative of differences, either negative or positive, from the predetermined value. This output is supplied as an input to the motor driver circuit 420 for supply roll motor 18. Circuit 420 provides conventional motor drive circuitry for drive motor 18 but also includes a power amplifier which takes the signal on line 418 and increases or decreases the constant torque via line 165 on motor 18 represented by arrow 18' according to whether the compared deviation from the desired dancer roll tension is respectively too little or too much.

While the invention has been described in conjunction with specific embodiments, it is evident that many alternatives, modifications and variations will be apparent to those skilled in the art in light of the foregoing description. Accordingly, it is intended to embrace all such alternatives, modifications, and variations as fall within the spirit and scope of the appended claims.

What is claimed is:

1. The method of ensuring superimposed color component images on a section of recording medium in the production of individual color component images to form a multicolor composite image by a color electrographic recording apparatus comprising the steps of forming a series of tracking indicia on the medium adjacent at least one edge thereof, the indicia having a known spacing relationship and representative of a given value, observing the indicia as the medium is moved through the apparatus, determining whether the value obtained from the observed spacing between said indicia is the same or different from said given value, processing any difference in the values to form an error sample representative any such difference, and averaging a plurality of such error samples together, producing a correction signal based upon said averaging representative of an average in the shrinkage or expansion of said medium during medium transport, and applying the correction signal in the production of the color component images to prevent image misalignment due to medium shrinkage or expansion occurring during the production process.

2. In a color electrographic recording apparatus for producing on a recording medium a composite color image comprising a plurality of superimposed component images of different colors and comprising means for transporting said recording medium along a predetermined path through said apparatus, a recording station in said path and having a recording head with electrode means for forming a latent image on said recording medium, control means operative to energize said electrode means to create said latent image, a plurality of developing means adjacent at least one side of said recording station, each of said developing means for developing a latent image produced on said recording medium at said recording station into a corresponding visible component image of a respective color, said transport means operative to pass a section of said recording medium through said recording station to form a component latent image followed by its respective color development and reverse the direction of medium transport to permit formation of the next component latent image followed bt its respective color development and repeating this process until all component latent images and their respective color development have been completed to form said composite color image, registration means associated with the transport of said recording medium and said control means to form each component latent image so that said component color images will be superimposed on one another, said registration means includes recording means at said recording station to form latent tracking indicia on said recording medium outside the field of said composite color image followed by its visible development during the first pass of said recording medium section through said recording station and means associated with the transport of said recording medium to sense said tracking indicia and produce information on-the-fly indicative of positional locations both longitudinally and laterally along said recording medium section to permit longitudinal and lateral registration of said component latent images.

3. The apparatus of claim 2 wherein said associated means includes means to optically sense said indicia and provide electrical signals representative of said information.

4. The apparatus of claim 2 wherein said associated means includes means to provide relative translation between said recording medium and said recording head.

5. The apparatus of claim 4 wherein said translation means comprises medium guide servo control to laterally translate a medium supply roll from which said recording medium is paid out onto said path.

6. The apparatus of claim 4 wherein said translation means comprises a recording head lateral position control to laterally translate said recording head relative to said recording medium.

7. The apparatus of claim 4 wherein said translation means includes a recording head rotational position control to rotate said recording head relative to said recording medium.

8. The apparatus of claim 2 wherein said associated means includes medium drive servo means to control the rate of movement of said recording medium along said path based upon said information.

9. The apparatus of claim 2 wherein said associated means includes means to control the frequency of energizing said electrode means.

10. The apparatus of claim 2 wherein said tracking indicia comprises a plurality of aligned tracking marks adjacent both edges of said recording medium section.

11. The apparatus of claim 10 wherein said tracking marks comprise registration marks of equal spacing and width.

12. The apparatus of claim 10 wherein said registration marks are preceeded by a plurality aligned initializing marks at the beginning of said recording medium section, said initializing marks having a different geometric shape compared to said registration marks.

13. the apparatus of claim 12 wherein said different geometric shape comprises a different mark width.

14. The apparatus of claim 12 wherein the change from said initializing marks to said registration marks is indicative of the starting location on said recording medium section for each of said latent component images.

15. The apparatus of claim 10 wherein said associated means produces signal information derived from the observation of said aligned tracking marks indicative of changes in length of said recording medium section.

16. The apparatus of claim 2 wherein said tracking indicia comprises, as formed, a series of uniformly spaced and aligned tracking marks near both edges of said recording medium section but outside the region for said component latent images.

17. The apparatus of claim 16 wherein said associated means produces signal information derived from the observation of said aligned tracking marks indicative of changes in length and width of said recording medium section.

18. The apparatus of claim 10 wherein said aligned tracking marks are adjacent both edges of said recording medium and a tracking line parallel and adjacent to both of said aligned tracking marks.

19. The apparatus of claim 18 wherein said associated means produces signal information derived from the observation of said aligned tracking marks indicative of changes in length and width of said recording medium section.

20. In a color electrographic recording apparatus for producing a composite color image comprising a plurality of superimposed component images of different colors on a recording medium and including registration means associated with the transport of said recording medium through said apparatus for determining any shrinkage or expansion of said medium during said transport and creation of said composite color image and comprising a series of aligned tracking indicia on said medium, said tracking indicia having a known spacing relationship and representative of a known value, initializing indicia preceding said tracking indicia and having an optically recognizible distinctive feature relative to said tracking indicia, electro-optic sensor means positioned to observe said indicia as said recording medium is transported through said apparatus, circuit means coupled to said electro-optic sensor means to produce a signal representative of the spacing relationship of said indicia, circuit means responsive to said signal indicative of recognition of said initializing indicia and determinative of the point of transition from the last of said initializing indicia to the first of said tracking indicia indicative of the starting point for each of said component color images.

21. In the color electrographic recording apparatus of claim 20 wherein said circuit means further including means to compare said signal with said known value and produce an error signal representative of any difference due to said comparison, said error signal representative of shrinkage or expansion of said medium during said medium transport, and means responsive to said error signal to correct in advance for misalignment imposed upon the formation of said component color images due to medium shrinkage or expansion thereby maintaining on-the-fly image superimposition.

22. In a color electrographic recording apparatus for producing a composite color image comprising a plurality of superimposed component images of different colors on a recording medium and including registration means associated with the transport of said recording medium through said apparatus for determining any shrinkage or expansion of said medium during said transport and creation of said composite color image and comprising a series of tracking indicia on said medium adjacent both edges thereof, said tracking indicia having a known spacing relationship between the series of said indicia along said medium edges as well as along each of said medium edges, said spacing relationships representative of known values, electro-optic sensor means positioned to observe said indicia as said recording medium is transported through said apparatus, said circuit means coupled to said electro-optic sensor means productive of signals representative of the spacing relationship of said indicia both laterally and longitudinally of said medium, means to compare said signals with said known values and produce error signals representative of any difference due to said comparisons, said error signals respectively representative of shrinkage or expansion of said medium occurring both laterally and longitudinally during said medium transport, and means responsive to said error signals to correct for misalignment imposed upon the formation of said component color images due to medium shrinkage or expansion both laterally and longitudinally of said medium thereby maintaining on-the-fly image superimposition.

23. The method of ensuring superimposed color component images on a section of recording medium in the production of individual color component images to form a multicolor composite image by a color electrographic recording apparatus comprising the steps of forming a series of tracking indicia on the medium adjacent at least one edge thereof, the indicia having a known spacing relationship and representative of a given value, providing some of the initial of said tracking indicia with a differently observable characteristic, observing the indicia as the medium is moved through the apparatus, determining the transition point from said initial tracking indicia to the remaining tracking indicia based upon said characteristic, counting said remaining tracking indicia from said transition point to a predetermined point wherein the production of each of said color component images is to be initiated, determining whether the value obtained from the observed spacing of said indicia is the same or different from said given value, processing any differences in the values to form a correction signal representative of either a shrinkage or expansion of the medium section, and applying the correction signal in the production of the color component images to prevent image misalignment due to medium shrinkage or expansion occurring during the production process.

24. In a color electrographic recording apparatus having a multistylus recording head for sequentially creating successive latent electrographic lines on a moving recording medium together representing a composite image and wherein multiple passes of the same region of said recording medium relative to said recording head creative of a composite color image comprising a plurality of superimposed component images of different colors, registration means associated with the transport of said recording medium through said apparatus for determining any shrinkage or expansion of said medium during medium transport and the creation of said composite color image and further comprising a series of tracking indicia on said medium adjacent at least one edge of thereof, said tracking indicia having a known spacing relationship and representative of a known value, initializing indicia preceding said tracking indicia and having an optically recognizable distinctive feature relative to said tracking indicia, electro-optic sensor means positioned to observe said indicia as said recording medium is transported through said apparatus, circuit means coupled to said electro-optic sensor means to produce a signal representative of the spacing relationship of said indicia, electrographic circuit means responsive to said signal indicative of recognition of said initializing indicia and determinative of the point of transition from the last of said initializing indicia to the first of said tracking indicia, said electrographic circuit means further including means to compare said signal with said known value and produce an error signal representative of any difference due to said comparison, said error signal representative of shrinkage or expansion of said medium during medium transport, and means responsive to said error signal to accordingly either delay or advance the placement of said successive latent electrographic lines in the formation of said component color images due respectively to either medium shrinkage or medium expansion thereby maintaining on-the-fly image superimposition.

25. In the color electrographic recording apparatus of claim 24 wherein said initializing indicia are identical to said tracking indicia but are of a different dimensional width.

26. In the color electrographic recording apparatus of claim 25 wherein said initializing indicia are smaller dimensional width than said tracking indicia.

27. In a color electrographic recording apparatus having a multistylus recording head for sequentially creating successive latent electrographic lines on a moving recording medium together representing a composite image and wherein multiple passes of the same region of said recording medium relative to said recording head creative of a composite color image comprising a plurality of superimposed component images of different colors, registration means associated with the transport of said recording medium through said apparatus for determining any shrinkage or expansion of said medium during medium transport and the creation of said composite color image and further comprising a series of aligned tracking indicia on said medium, said tracking indicia having a known spacing relationship and representative of a known value, electro-optic sensor means positioned to observe said indicia as said recording medium is transported through said apparatus, circuit means coupled to said electro-optic sensor means to produce a signal representative of the spacing relationship between each of said observed indicia, said electrographic circuit means further including means to compare said signal with said known value and produce an error sample representative of any difference due to said comparison, means to average a plurality of said error samples together and produce an error signal representative of a running average in the shrinkage or expansion of said medium during medium transport and employed to either delay or advance the placement of said successive latent electrographic lines in the formation of said component color images due respectively to either medium shrinkage or medium expansion thereby maintaining on-the-fly component image superimposition.

28. In the color electrographic recording apparatus of claim 27 wherein said means to provide a running average comprises means to hold N error samples wherein the first sample in said hold means is the last sample out of said hold means, said hold means dropping the last sample upon the receipt of each new sample constituting an error sample cycle, means to determine the average of said N error samples over a plurality of said error cycles, and summing means to provide a sum value of the average of said N error samples.

29. In the color electrographic recording apparatus of claim 28 which further comprises
means representative of an allowable error band and means to compare said sum value with said band, and means to produce said error signal when said sum value falls outside of said allowable error band.

30. In the color electrographic recording apparatus of claim 29 wherein said error signal producing means decrements said sum value upon production of said error signal.

31. In the color electrographic recording apparatus of any one of the claims 27 through 30 wherein there is a series of tracking indicia adjacent both edges of said recording medium.

32. The apparatus of claim 27 wherein said tracking indicia comprise registration marks of equal spacing and width.

33. The apparatus of claim 27 wherein said registration marks are preceeded by a plurality aligned initializing marks at the beginning of a recording medium section for said composite image, said initializing marks having a different detectable feature compared to said registration marks.

34. The apparatus of claim 33 wherein said different detectable feature comprises a different mark width.

35. The apparatus of claim 33 wherein the change from said initializing marks to said registration marks is indicative of the starting location on said recording medium section for each of said component images.

* * * * *